United States Patent
Babaei et al.

(10) Patent No.: US 10,321,505 B2
(45) Date of Patent: Jun. 11, 2019

(54) DUAL CONNECTIVITY BASED ON LISTEN BEFORE TALK INFORMATION

(71) Applicants: Alireza Babaei, Fairfax, VA (US);
Esmael Dinan, Herndon, VA (US);
Kyungmin Park, Herndon, VA (US)

(72) Inventors: Alireza Babaei, Fairfax, VA (US);
Esmael Dinan, Herndon, VA (US);
Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 15/854,324

(22) Filed: Dec. 26, 2017

(65) Prior Publication Data

US 2018/0184475 A1    Jun. 28, 2018

Related U.S. Application Data

(60) Provisional application No. 62/438,483, filed on Dec. 23, 2016.

(51) Int. Cl.
*H04W 76/15* (2018.01)
*H04W 88/06* (2009.01)
(Continued)

(52) U.S. Cl.
CPC ........... *H04W 76/15* (2018.02); *H04W 16/14* (2013.01); *H04W 24/10* (2013.01);
(Continued)

(58) Field of Classification Search
CPC ..... H04W 76/15; H04W 16/14; H04W 24/10; H04W 72/1215; H04W 88/06;
(Continued)

(56) References Cited

U.S. PATENT DOCUMENTS

| 9,565,605 B1 * | 2/2017 | Yang ..................... H04W 76/18 |
| 2017/0265172 A1 * | 9/2017 | Futaki .................... H04W 16/14 |

(Continued)

FOREIGN PATENT DOCUMENTS

JP    6239756 B2 *    7/2014    ............ H04W 24/10

OTHER PUBLICATIONS

RP-161702; 3GPP TSG RAN Meeting #73; New Orleans, USA, Sep. 19-22, 2016; Documents for: Discussion; Agenda item: 10.1.1; Title: Motivation for new WI Further enhancement on FeLAA; ZTE Corporation.

(Continued)

*Primary Examiner* — Mong-Thuy T Tran
(74) *Attorney, Agent, or Firm* — David Grossman; Esmael Dinan; Kavon Nasabzadeh

(57) ABSTRACT

A first base station receives from a second base station, an application protocol message that comprises radio resource status information of one or more licensed assisted access (LAA) cells of the second base station. The radio resource status information comprises at least one listen before talk (LBT) parameter of one or more LBT processes associated with the second base station. The first base station decides to request the second base station to allocate radio resources for a bearer of a wireless device based on the at least one LBT parameter. The first base station transmits a second message indicating a request to add the second base station for dual connectivity of the wireless device. The first base station transmits to the wireless device configuration parameters of a cell group comprising the one or more LAA cells for communication with the second base station.

20 Claims, 31 Drawing Sheets

(51) Int. Cl.
  *H04W 24/10* (2009.01)
  *H04W 72/12* (2009.01)
  *H04W 16/14* (2009.01)
  *H04W 72/04* (2009.01)
  *H04W 72/08* (2009.01)
  *H04W 8/08* (2009.01)
  *H04L 5/00* (2006.01)
  *H04W 48/16* (2009.01)

(52) U.S. Cl.
  CPC ....... *H04W 72/042* (2013.01); *H04W 72/082* (2013.01); *H04W 72/1215* (2013.01); *H04W 88/06* (2013.01); *H04L 5/001* (2013.01); *H04W 8/08* (2013.01); *H04W 48/16* (2013.01)

(58) Field of Classification Search
  CPC ... H04W 8/08; H04W 72/042; H04W 72/082; H04W 48/16; H04L 5/001
  USPC .......................................................... 455/450
  See application file for complete search history.

(56) References Cited

U.S. PATENT DOCUMENTS

| | | | | |
|---|---|---|---|---|
| 2017/0310433 | A1* | 10/2017 | Dinan | H04W 72/048 |
| 2018/0027590 | A1* | 1/2018 | Yerramalli | H04W 76/28 370/328 |
| 2018/0041989 | A1* | 2/2018 | Shimezawa | H04W 16/14 |
| 2018/0048498 | A1* | 2/2018 | Stern-Berkowitz | H04L 5/0048 |
| 2018/0220303 | A1* | 8/2018 | Futaki | H04W 48/18 |
| 2018/0302795 | A1* | 10/2018 | Harada | H04W 16/14 |
| 2018/0332576 | A1* | 11/2018 | Oh | H04W 16/14 |
| 2018/0332579 | A1* | 11/2018 | Kang | H04L 5/14 |

OTHER PUBLICATIONS

3GPP TS 36.211 V14.0.0 (Sep. 2016); 3rd Generation Partnership Project; Technical Specification Group Radio Access Network; Evolved Universal Terrestrial Radio Access (E-UTRA); Physical channels and modulation (Release 14)L.
3GPP TS 36.212 V14.0.0 (Sep. 2016); 3rd Generation Partnership Project; Technical Specification Group Radio Access Network; Evolved Universal Terrestrial Radio Access (E-UTRA); Multiplexing and channel coding (Release 14).
3GPP TS 36.213 V14.0.0 (Sep. 2016); 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.0.0 (Sep. 2016); 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.0.0 (Sep. 2016); 3rd Generation Partnership Project; Technical Specification Group Radio Access Network; Evolved Universal Terrestrial Radio Access (E-UTRA); Radio Resource Control (RRC); Protocol specification (Release 14).
IEEE 802 Interim Session; Atlanta, USA; Jan. 11-16, 2015; 3GPP & unlicensed spectrum; Dino Fiore, Chairman of 3GPP TSG-RAN; (Qualcomm Technologies Inc.).
R1-154139; 3GPP TSG RAN WG1 #82; Beijing, China, Aug. 24-28, 2015; Agenda item: 7.2.4.1; Source: Samsung; Title: CCA threshold and transmission power for LAA; Document for: Discussion and Decision.
R1-155096; 3GPP TSG RAN WG1 82bis Meeting; Malmo, Sweden, Oct. 5-9, 2015; Agenda Item: 7.2.3.1; Source: Huawei, HiSilicon; Title: Evaluations for energy detection threshold; Document for: Discussion and decision.
R1-155097; 3GPP TSG RAN WG1 82bis Meeting; Malmo, Sweden, Oct. 5-9, 2015; Agenda Item: 7.2.3.1; Source: Huawei, HiSilicon; Title: Adaptation rules of energy detection threshold; Document for: Discussion and decision.
R1-156510; 3GPP TSG RAN WG1 Meeting #83; Anaheim, USA, Nov. 15-22, 2015; Agenda item: 6.2.3.1; Source: Intel Corporation; Title: Remaining Details on LBT; Document for: Discussion and Decision.
R1-157281; 3GPP TSG RAN WG1 Meeting #83; Anaheim, USA, Nov. 15-22, 2015; Agenda item: 6.2.3.1; Source: HTC; Title: Discussion on Adaptation Rules of the Maximum Energy Detection; Threshold in LAA Coexistence; Document for: Discussion / Decision.
R1-162102; 3GPP TSG RAN WG1 Meeting #84bis; Busan, Korea, Apr. 11-15, 2016; Agenda Item: 7.3.1.5; Source: Huawei, HiSilicon; Title: Further details on UL LBT to enable UE multiplexing of uplink transmissions; Document for: Discussion/Decision.
R1-162264; 3GPP TSG RAN WG1 Meeting #84bits; Busan, Korea Apr. 11-15, 2016; Source: CATT; Title: Uplink channel access scheme for Rel-14 eLAA; Agenda Item: 7.3.1.5; Document for: Discussion/Decision.
R1-162327; 3GPP TSG RAN WG1 Meeting #84bis; Busan, Korea Apr. 11-15, 2016; Agenda Item: 7.3.1.5; Source: ZTE Microelectronics Technology, Nubia Technology; Title: Frame design and signalling for LAA UL based on FS3; Document for: Discussion and Decision.
R1-162328; 3GPP TSG RAN WG1 Meeting #84bis; Busan, Korea, Apr. 11-15, 2016; Agenda Item: 7.3.1.5; Source: ZTE Microelectronics Technology, Nubia Technology; Title: Discussion on the UL LBT for LAA; Document for: Discussion and Decision.
R1-162331; 3GPP TSG RAN WG1 Meeting #84bis; Busan, Korea, Apr. 11-15, 2016; Agenda Item: 7.3.1.5; Source: Fujitsu; Title: On UL Channel Access Framework for Enhanced LAA; Document for: Discussion/Decision.
R1-162359; 3GPP TSG RAN WG1 Meeting #84bis; Busan, Korea, Apr. 11-15, 2016; Agenda item: 7.3.1.5; Source: Intel Corporation; Title: UL LBT details; Document for: Discussion and Decision.
R1-162753; GPP TSG RAN WG1 Meeting #84bis; Busan, Korea Apr. 11-15, 2016; Source: Kyocera; Title: Channel Access Scheme for UE multiplexing; Agenda Item: 7.3.1.5; Document for: Discussion/Decision.
R1-162804; 3GPP TSG RAN WG1 Meeting #84bis; Busan, Korea, Apr. 11-15, 2016; Source: NTT Docomo, Inc.; Title: Discussion on channel access framework for eLAA UL; Agenda Item: 7.3.1.5; Document for: Discussion and Decision.
R1-162920; 3GPP TSG RAN WG1 Meeting #84bis; Busan, South Korea, Apr. 11-15, 2016; Title: Channel Access for LAA UL; Source: Nokia, Alcatel-Lucent Shanghai Bell; Agenda Item: 7.3.1.5; Document for: Discussion and Decision.
R1-162941; 3GPP TSG RAN WG1 Meeting #84bis; Busan, Korea, Apr. 11-15, 2016; Source: MediaTek Inc.; Title: eLAA uplink channel access; Agenda Item: 7.3.1.5; Document for: Discussion.
R1-164071; 3GPP TSG RAN WG1 85 Meeting; Nanjing, China, May 23-27, 2016; Agenda Item: 6.2.1.5; Source: Huawei, HiSilicon; Title: Discussion on the application of LBT options in eLAA; Document for: Discussion and decision.
R1-164132; 3GPP TSG RAN WG1 Meeting #85; Nanjing, China, May 23-27, 2016; Agenda item: 6.21.5; Source: Intel Corporation; Title: Remaining details of UL LBT; Document for: Discussion and Decision.
R1-164133; 3GPP TSG RAN WG1 Meeting #85; Nanjing, China, May 23-27, 2016; Agenda item: 6.2.1.5; Source: Intel Corporation; Title: UL grant transmission; Document for: Discussion and Decision.
R1-164200; 3GPP TSG RAN WG1 Meeting #85; Nanjing, China May 23-27, 2016; Source: CATT; Title: UL channel access for Rel-14 eLAA; Agenda Item: 6.2.1.5; Document for: Discussion/Decision.

(56) References Cited

OTHER PUBLICATIONS

R1-164318; 3GPP TSG RAN WG1 Meeting #85; Nanjing, China, May 23-27, 2016; Agenda item: 6.2.1.5; Source: Sequans Communications; Title: Considerations for LAA UL LBT; Document for: Discussion and decision.
R1-164415; 3GPP TSG RAN WG1 #85; May 23-27, 2016; Nanjing, China; Agenda item: 6.2.1.5; Source: Qualcomm Incorporated; Title: UL Channel Access for eLAA; Document for: Discussion and Decision.
R1-164503; 3GPP TSG RAN WG1 meeting #85; Nanjing, China, May 23-27, 2016; Agenda Item: 6.2.1.5; Source: LG Electronics; Title: Further details on channel access in LAA UL; Document for: Decision.
R1-164601; 3GPP TSG RAN WG1 Meeting #85; Nanjing, China May 23-27, 2016; Agenda Item: 6.2.1.5; Source: ZTE; Title: Frame design and signalling for LAA UL based on FS3; Document for: Discussion and Decision.
R1-164603; 3GPP TSG RAN WG1 Meeting #85; Nanjing, China May 23-27, 2016; Source: ZTE; Title: Discussion on the UL LBT for LAA; Agenda item: 6.2.1.5; Document for: Discussion and Decision.
R1-165155; 3GPP TSG-RAN WG1#85; Nanjing, China, May 23-27, 2016; Source: Ericsson; Title: On Channel Access Procedures for Transmissions with Only UL Grants; Agenda Item: 6.3.1.5; Document for: Discussion and Decision.
R1-165156; 3GPP TSG-RAN WG1#85; Nanjing, China, May 23-27, 2016Source: Ericsson; Title: On Support of Conditional UL Transmissions without LBT; Agenda Item: 6.3.1.5; Document for: Discussion and Decision.
R1-165157; 3GPP TSG RAN WG1 Meeting #85; Nanjing, China, May 23-27, 2016; Source: Ericsson; Title: On UL Channel Access Procedures; Agenda Item: 6.3.1.5; Document for: Discussion and Decision.
R1-165159; 3GPP TSG RAN WG1 Meeting #85; Nanjing, China, May 23-27, 2016; Source: Ericsson; Title: On Signaling of UL Channel Access Parameters; Agenda Item: 63.1.5; Document for: Discussion and Decision.
R1-165190; 3GPP TSG RAN WG1 Meeting #85; Nanjing, China, May 23-27, 2016; Source: NTT Docomo, Inc.; Title: Discussion on channel access framework for eLAA UL; Agenda Item: 6.2.1.5; Document for: Discussion and Decision.
R1-165235; 3GPP TSG RAN WG1 meeting #85; Nanjing, China May 23-27, 2016; Agenda Item: 6.2.1.5; Source: Institute for Information Industry (III); Title: Uplink Channel Access Mechanisms in eLAA; Document for: Discussion and decision.
R1-165250; 3GPP TSG RAN WG1 Meeting #85; Nanjing, China May 23-27, 2016; Source: ETRI; Title: On channel access mechanism for eLAA; Agenda item: 6.2.1.5; Document for: Discussion and Decision.
R1-165252; 3GPP TSG RAN WG1 Meeting #85; Nanjing, China May 23-27, 2016; Source: WILUS Inc.; Title: Consideration on UL LBT Type Switching for eLAA; Agenda item: 6.2.1.5; Document for: Discussion/Decision.
R2-162368; 3GPP TSG-RAN2#93BIS meeting; Dubrovnik, Croatia, Apr. 11-15, 2016; Agenda Item: 8.1.1; Souce: MediaTek Inc.; Title: On priority classes for uplink LBT; Document for: Discussion and decision.
R2-162746; 3GPP TSG-RAN WG2 #93bis; Dubrovnik, Croatia, Apr. 11-15, 2016; Agenda Item: 8.1.1; Source: Ericsson; Title: Modelling of LBT for LAA; Document for: Discussion, Decision.
R2-163608; 3GPP TSG-RAN WG2 #94; Nanjing, China, May 23-27, 2016; Agenda item: 8.1.3; Source: Intel Corporation; Title: Selection of CAT-4 LBT priority class for eLAA; Document for: Discussion and Decision.
RP-141188; 3GPP TSG RAN Meeting #65; Edinburgh, Scotland, Sep. 9-12, 2014; Source: ZTE; Title: Supporting dual connectivity in LTE-U; Agenda Item: 14.1.1; Document for: Discussion.
RP-151725; 3GPP TSG RAN Meeting #70; Sitges, Spain, Dec. 7-10, 2015; Source: ZTE, Xinwei; Title: Supporting dual connectivity in LAA; Agenda Item: 14.1.1; Document for: Discussion.
RP-151978; 3GPP TSG RAN Meeting #70; Sitges, Spain, Dec. 7-10, 2015; revision of RP-yynnnn; Source: Ericsson, Huawei; Title: New Work Item on enhanced LAA for LTE; Document for: Approval; Agenda Item: 14.1.1.
RP-151979; 3GPP TSG RAN Meeting #70; Sitges, Spain, Dec. 7-10, 2015; Agenda item 14.1.1; Motivation for Enhanced Licensed Assisted Access for LTE in Rel-14; Ericsson.
RP-160926; 3GPP TSG RAN Meeting #72; Busan, Korea, Jun. 13-17, 2016; Source: ZTE; Title: Discussion on further enhancement of LAA for LTE; Agenda Item: 10.2.1; Document for: Discussion.
RP-161036; 3GPP TSG RAN Meeting #72; Busan, Korea, Mar. 13-16, 2016; Title: Motivation for New Work Item for Enhancing Utilization of CA for LTE; Source: Nokia, Alcatel-Lucent Shanghai Bell; Document for: Discussion; Agenda Item: 10.1.2.
RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum; Document for: Approval; Agenda Item: 10.1.1.
RP-161701; 3GPP TSG RAN Meeting #73; New Orleans, Sep. 19-22, 2016; Source: ZTE; Title: New WI proposal Further enhancement on FeLAA; Document for: Approval; Agenda Item: 10.1.1.

* cited by examiner

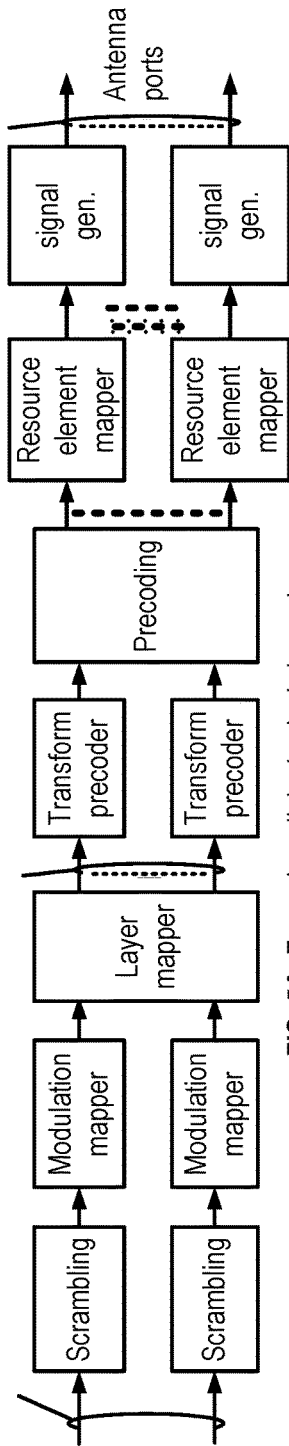
FIG. 5A Example uplink physical channel
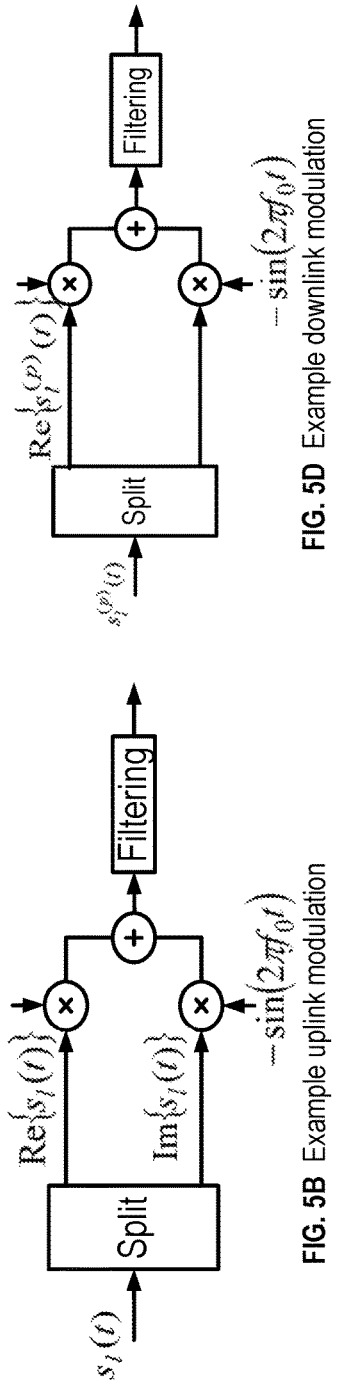
FIG. 5B Example uplink modulation
FIG. 5D Example downlink modulation
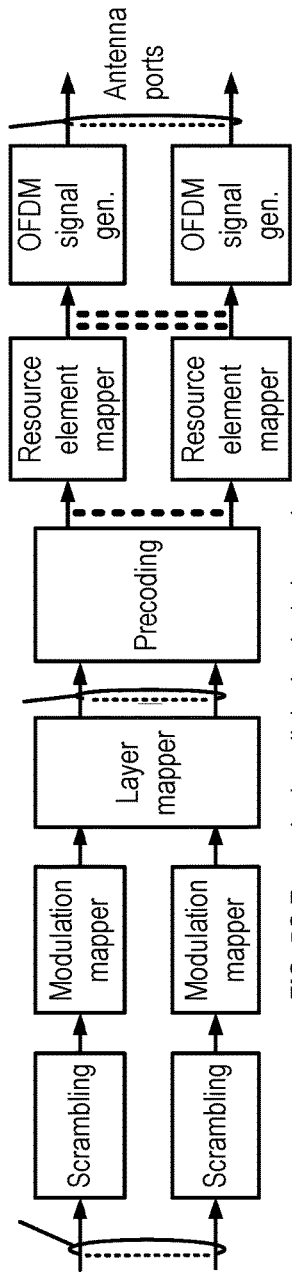
FIG. 5C Example downlink physical channel Dual-Connectivity at eNB

DUAL CONNECTIVITY BASED ON LISTEN BEFORE TALK INFORMATION

CROSS-REFERENCE TO RELATED APPLICATIONS

This application claims the benefit of U.S. Provisional Application No. 62/438,483, filed Dec. 23, 2016 which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

DETAILED DESCRIPTION OF EMBODIMENTS

Figure 1:
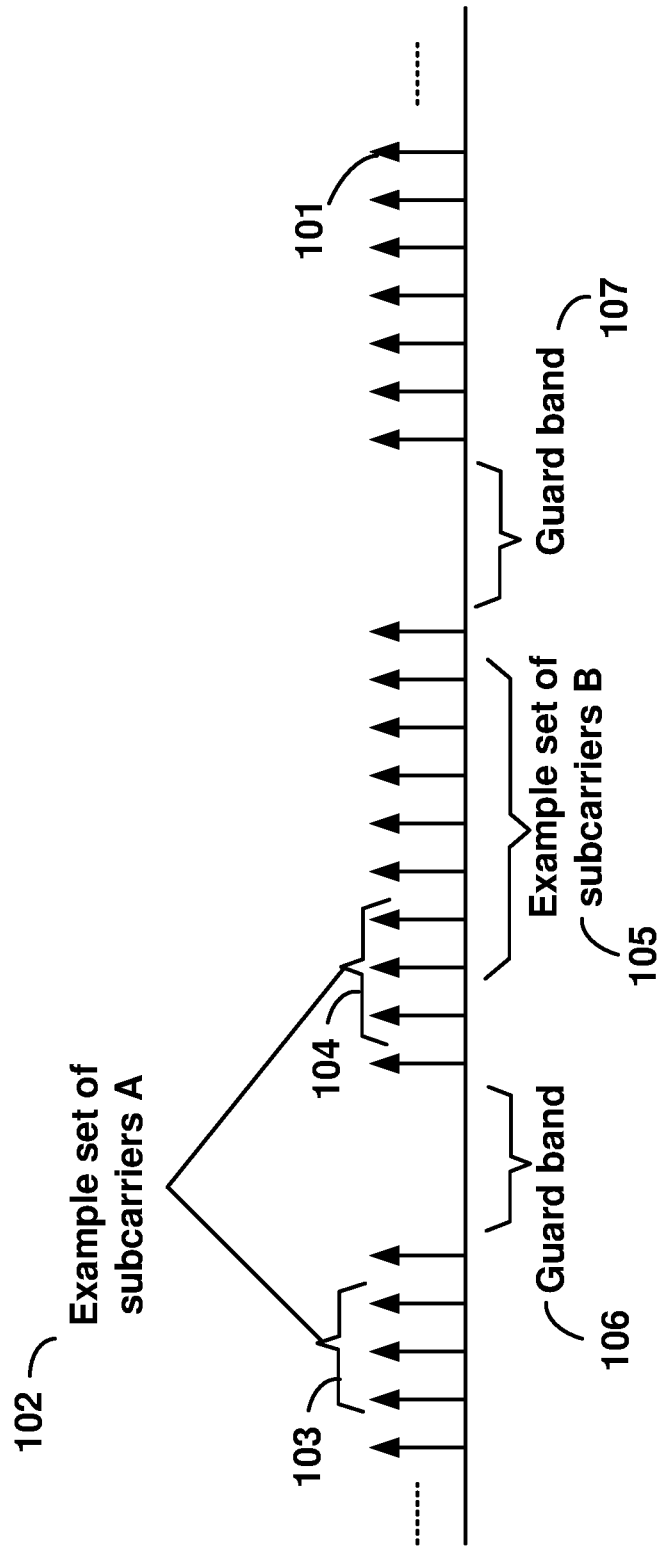
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LAA | licensed assisted access |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |

| | |
|---|---|
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
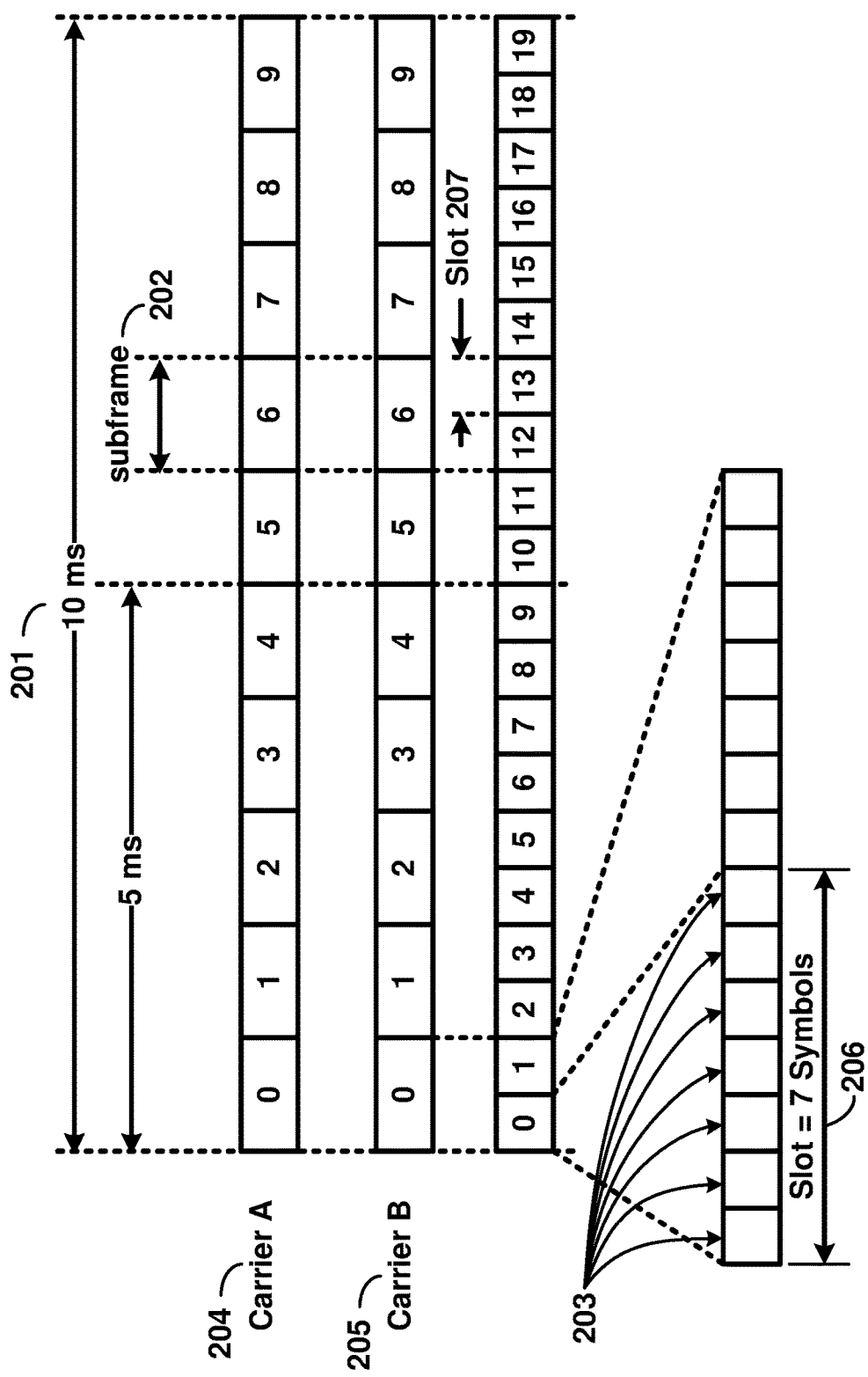
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
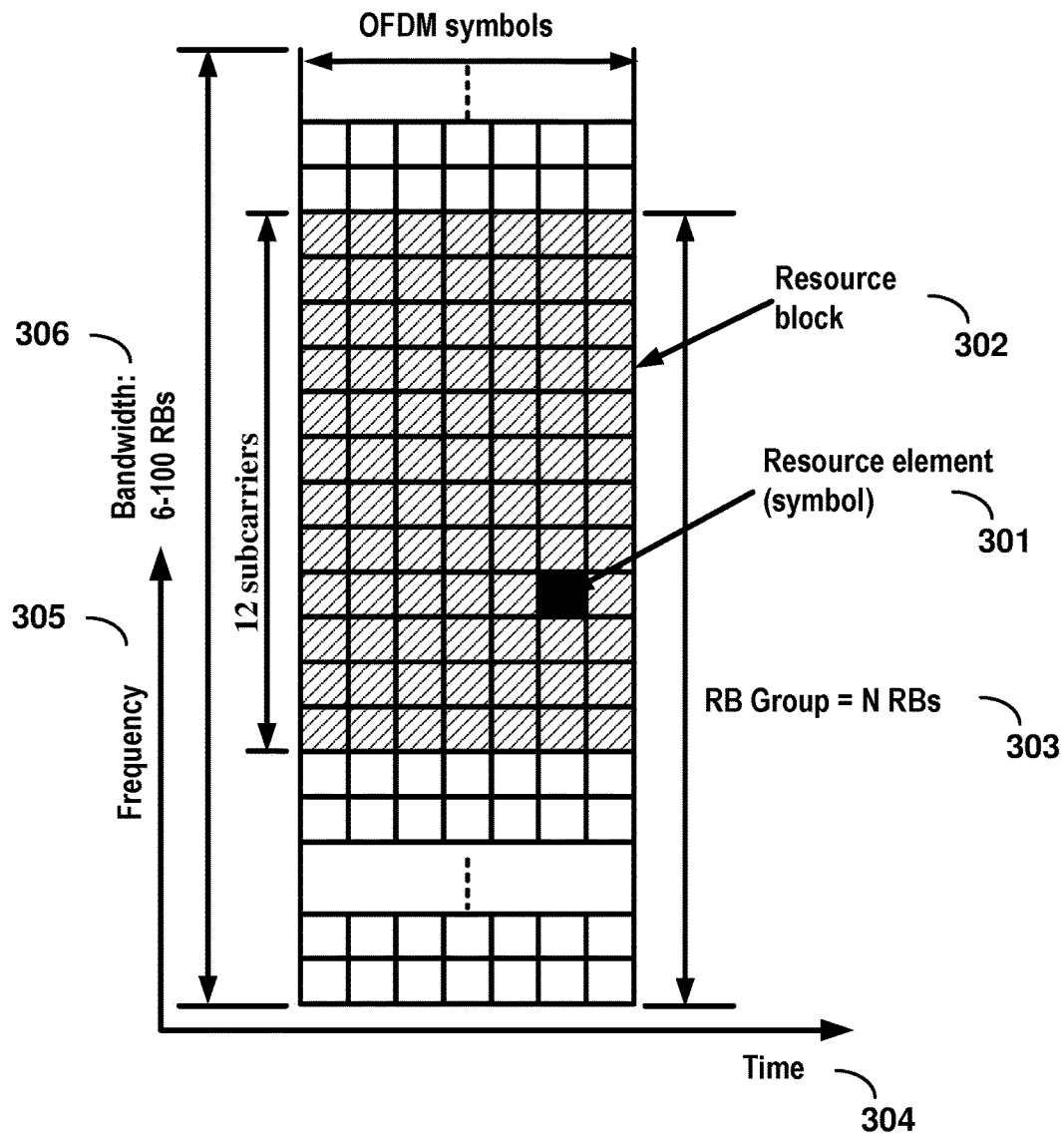
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
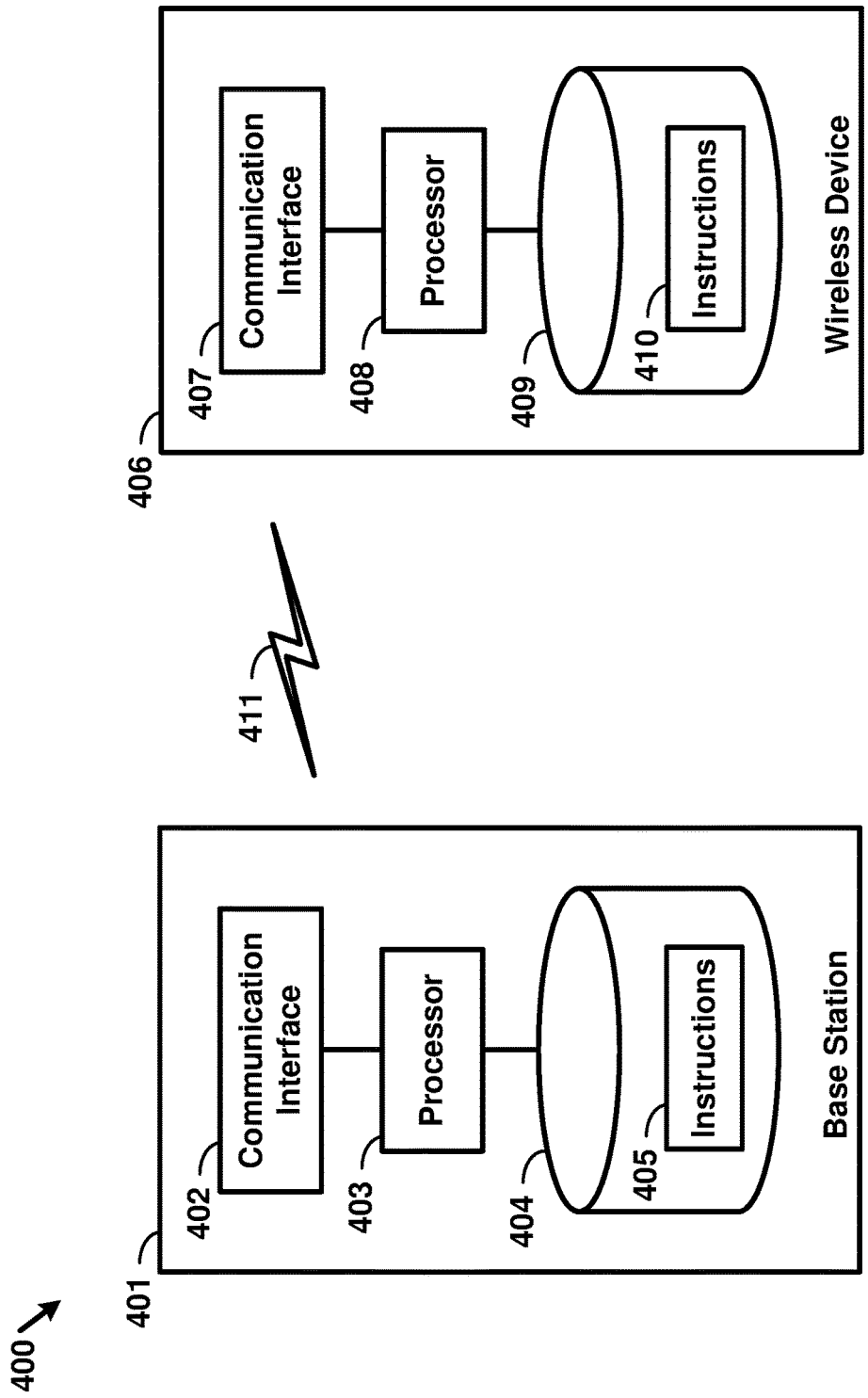
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5A, FIG. 5B, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
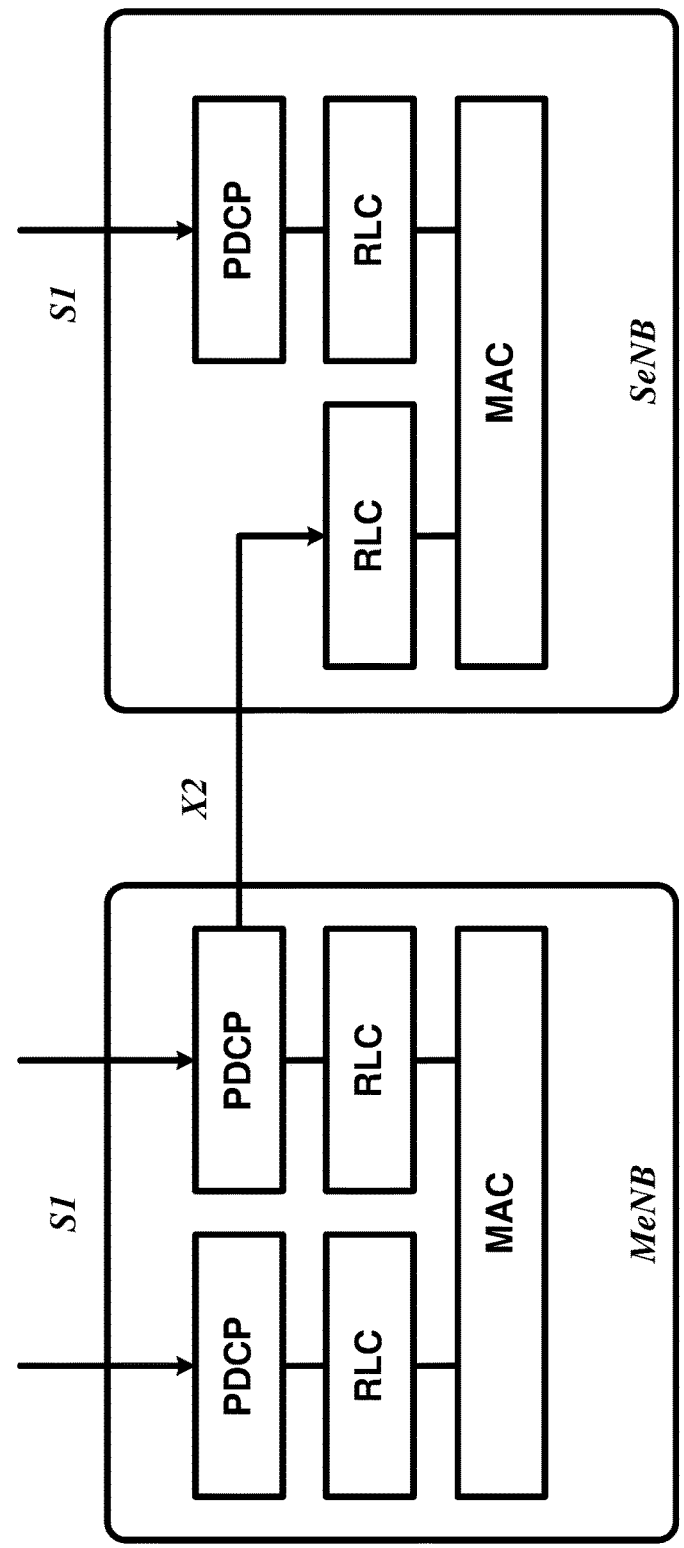
FIG. 6 is an example diagram for a protocol structure with CA and DC as per an aspect of an embodiment of the present disclosure.
Figure 7:
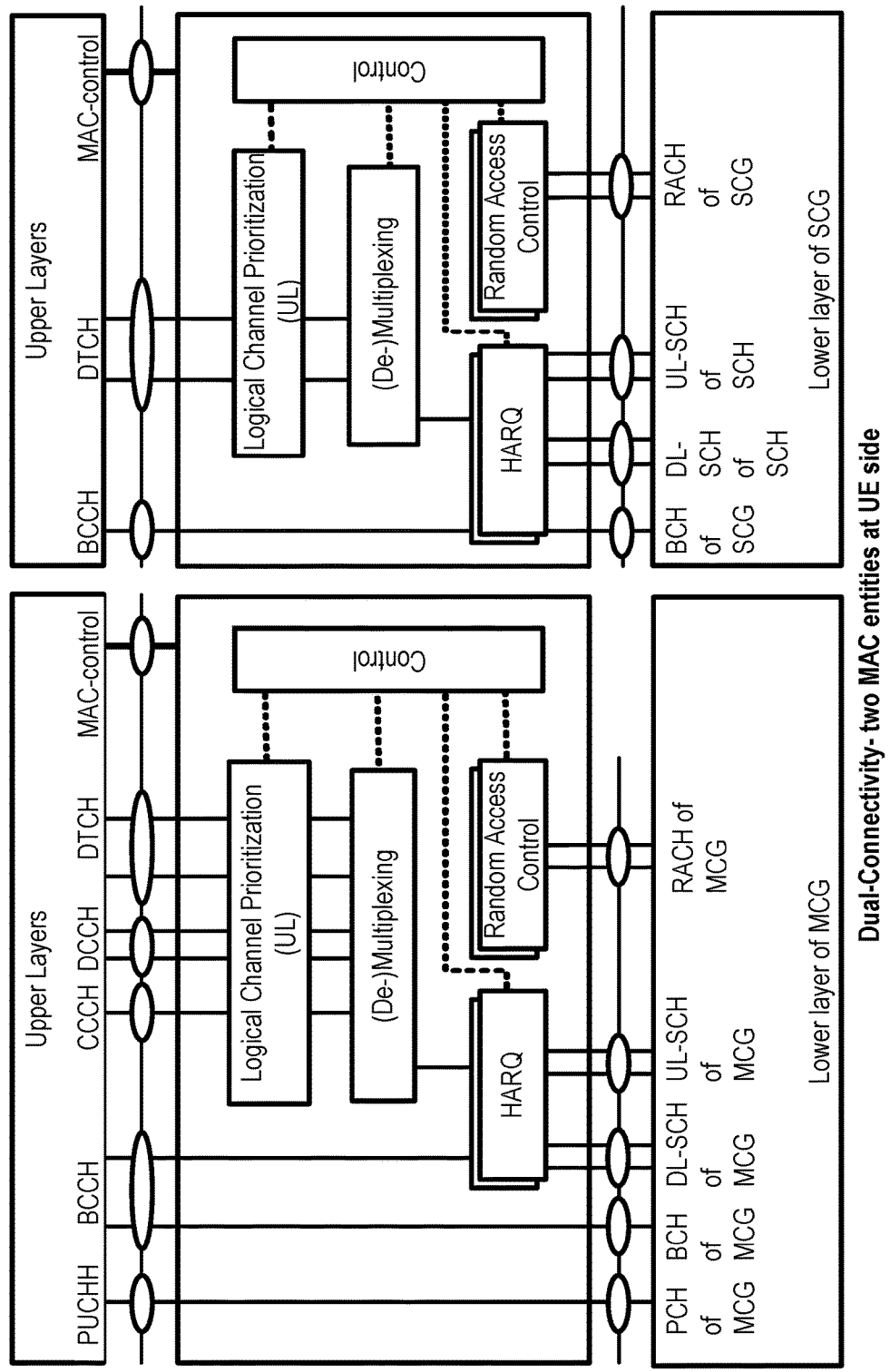
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
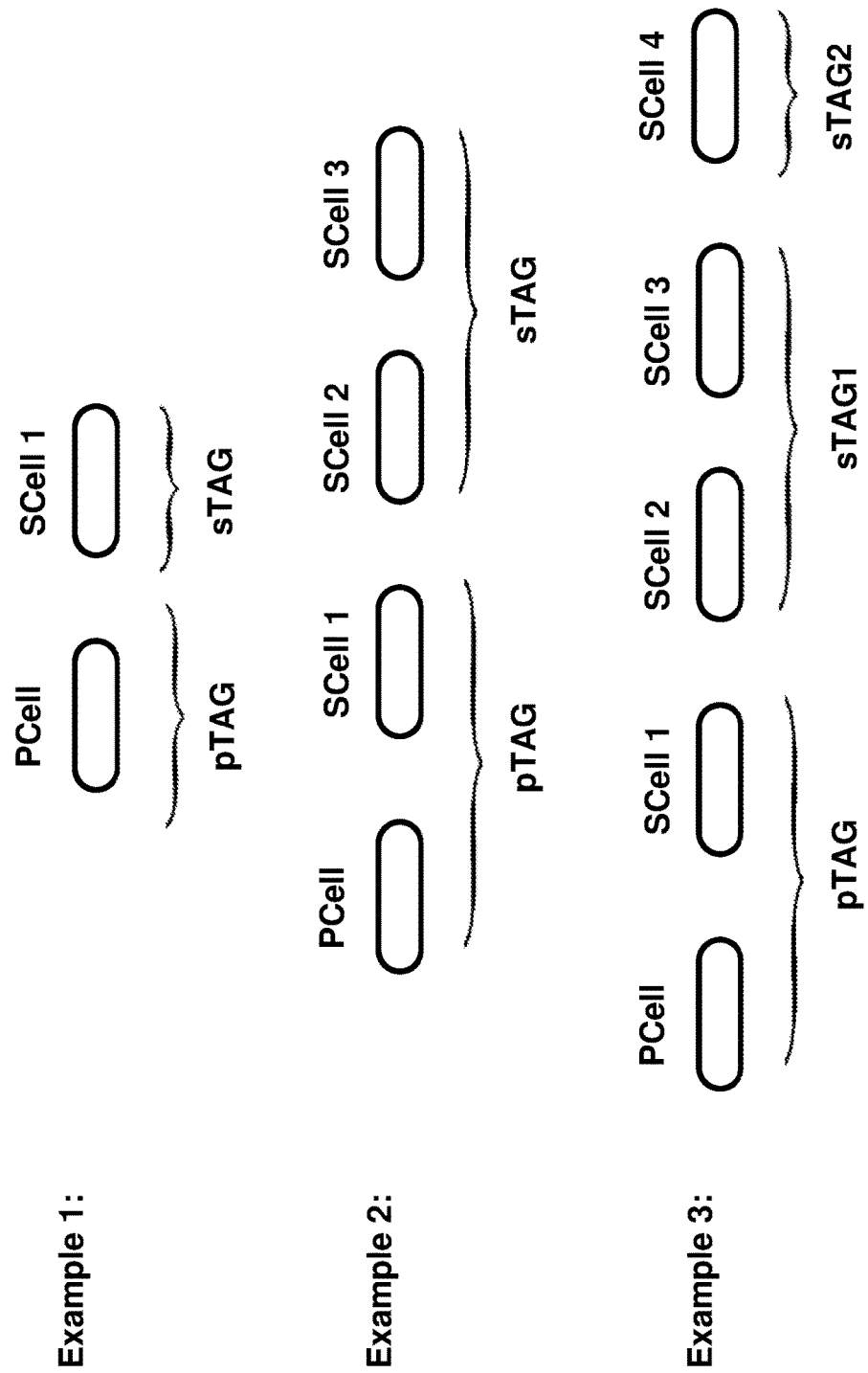
FIG. 8 shows example TAG configurations as per an aspect of an embodiment of the present disclosure.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
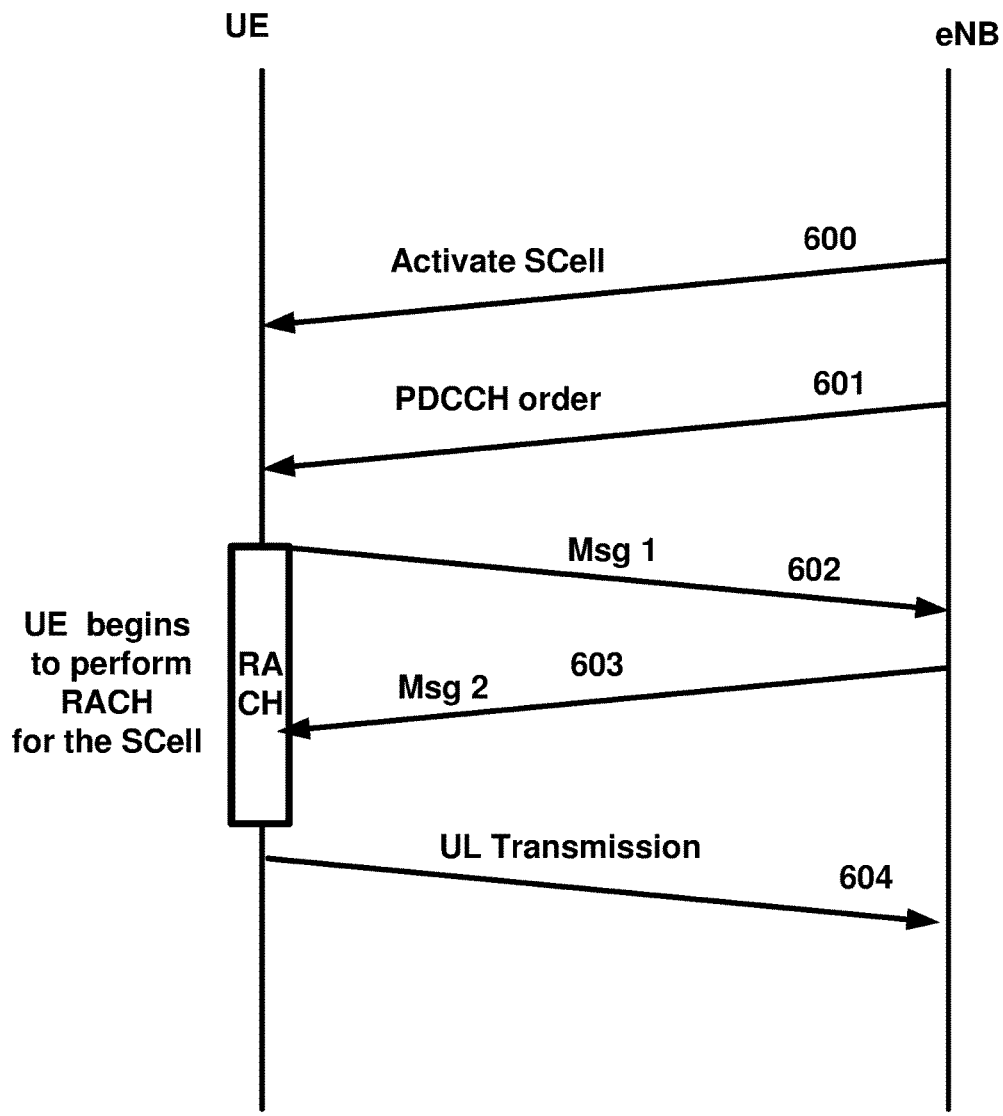
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
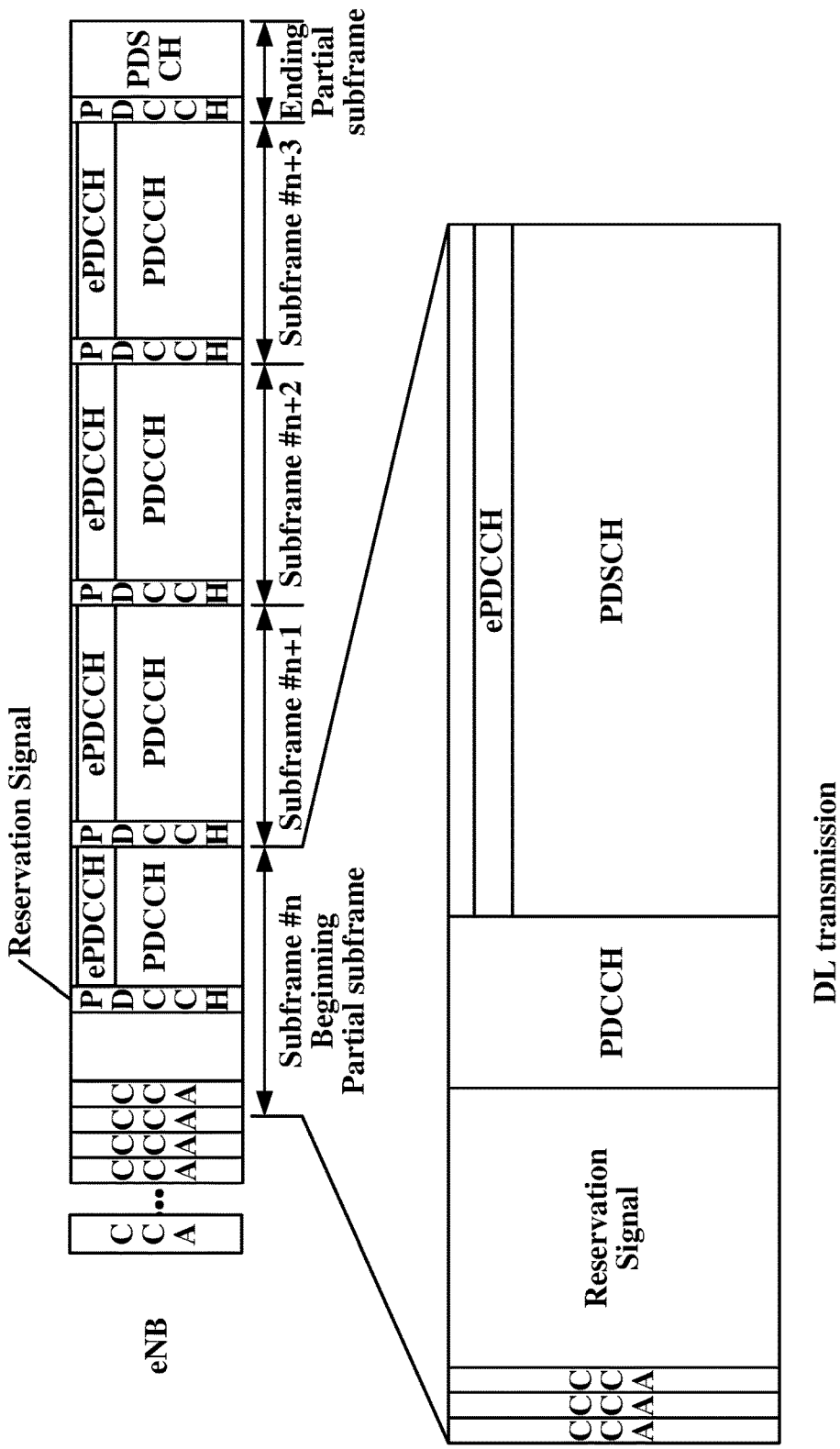
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiment, LTE transmission time may include frames, and a frame may include many subframes. The size of various time domain fields in the time domain may be expressed as a number of time units $T_s=1/(1500 \times 2048)$ seconds. Downlink, uplink and sidelink transmissions may be organized into radio frames with $T_f=307200 \times T_s=10$ ms duration.

In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame is $T_f=307200$ $T_s=10$ ms long and may comprise 20 slots of length $T_{slot}=15360\ T_s=0.5$ ms, numbered from 0 to 19. A subframe may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200\ T_s=10$ ms may comprise of two half-frames of length 153600 $T_s=5$ ms. A half frame may comprise five subframes of length 30720 $T_s=1$ ms. A subframe i may comprise two slots, 2i and 2i+1, of length $T_{slot}=15360\ T_s=0.5$ ms.

The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to 30720 $T_s=1$ ms.

Uplink-downlink configurations with both 5 ms and 10 ms downlink-to-uplink switch-point periodicity may be supported. In case of 5 ms downlink-to-uplink switch-point periodicity, the special subframe may exist in both half-frames. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least 1456·$T_s$.

In an example, in case multiple cells with different uplink-downlink configurations in the current radio frame are aggregated and the UE is not capable of simultaneous reception and transmission in the aggregated cells, the following constraints may apply. if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f=307200\,T_s=10$ ms long and comprises of 20 slots of length $T_{slot}=15360\,T_s=0.5$ ms, numbered from 0 to 19. A subframe may comprise as two consecutive slots where subframe i comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

Some example embodiments may be implemented in stand-alone unlicensed operation when a UE communications with an eNB via a plurality of unlicensed cells. Some example embodiments may be implemented in dual-connectivity configuration when a UE is connected to two eNBs via a plurality of licensed and/or unlicensed cells.

In an example, when configured with dual connectivity (DC), a UE may be simultaneously connected to two eNBs: e.g., a master eNB (MeNB) and a secondary eNB (SeNB). The MeNB and SeNB may be connected via an X2 interface.

In an example, E-UTRAN may support Dual Connectivity (DC) operation. A UE in RRC_CONNECTED equipped with multiple Rx/Tx may be configured to utilize radio resources provided by two distinct schedulers, located in two eNBs connected via a non-ideal backhaul over the X2 interface. The overall E-UTRAN architecture may be applicable for DC as well. eNBs involved in DC for a certain UE may assume two different roles: an eNB may either act as an MeNB or as an SeNB. In DC a UE may be connected to one MeNB and one SeNB.

Figure 11:
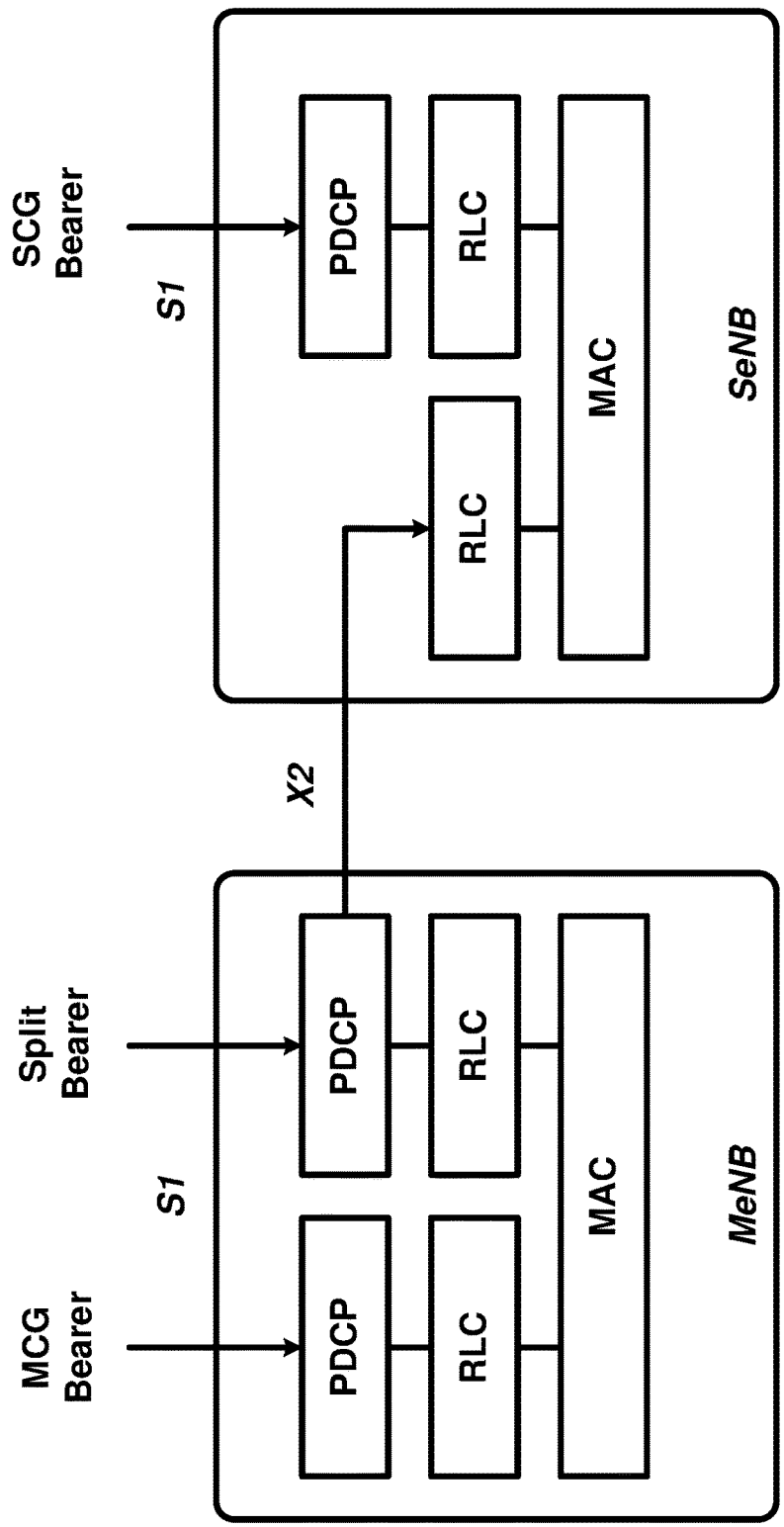
FIG. 11 is an example dual connectivity architecture with different bearer types as per an aspect of an embodiment of the present disclosure.

In an example, in DC, the radio protocol architecture that a particular bearer uses may depend on how the bearer is setup. In an example, three bearer types may exist: MCG bearer, SCG bearer and split bearer. Example bearer types are shown in FIG. 11. In an example, RRC may be located in MeNB and SRBs may be configured as MCG bearer type. In an example, SRBs may use the radio resources of the MeNB. In an example, at least one bearer may be configured to use radio resources provided by the SeNB.

In an example, inter-eNB control plane signalling for DC may be performed by means of X2 interface signalling. Control plane signalling towards the MME may be performed by means of S1 interface signalling. In an example, there may be one S1-MME connection per DC UE between the MeNB and the MME. An eNB may handle UEs independently, e.g., provide the PCell to some UEs while providing SCell(s) for SCG to others. An eNB involved in DC for a certain UE may control its radio resources and may be primarily responsible for allocating radio resources of its cells. Respective coordination between MeNB and SeNB may be performed by means of X2 interface signalling.

In an example, for dual connectivity two different user plane architectures may be allowed. In an example first architecture, the S1-U may terminate in the MeNB and the user plane data may be transferred from MeNB to SeNB, e.g., using the X2-U. In an example, second architecture, the S1-U may terminate in the SeNB.

In an example, different bearer options may be configured with different user plane architectures. U-plane connectivity may depend on the bearer option configured. In an example, for MCG bearers, the S1-U connection for the corresponding bearer(s) to the S-GW may be terminated in the MeNB. The SeNB may not be involved in the transport of user plane data for this type of bearer(s) over the Uu. In an example, for split bearers, the S1-U connection to the S-GW may be terminated in the MeNB. PDCP data may be transferred between the MeNB and the SeNB via X2-U. The SeNB and MeNB may be involved in transmitting data of this bearer type over the Uu. In an example, for SCG bearers, the SeNB may be directly connected with the S-GW via S1-U. The MeNB may not be involved in the transport of user plane data for this type of bearer(s) over the Uu. In an example, if only MCG and split bearers are configured, there may be no S1-U termination in the SeNB.

Figure 12:
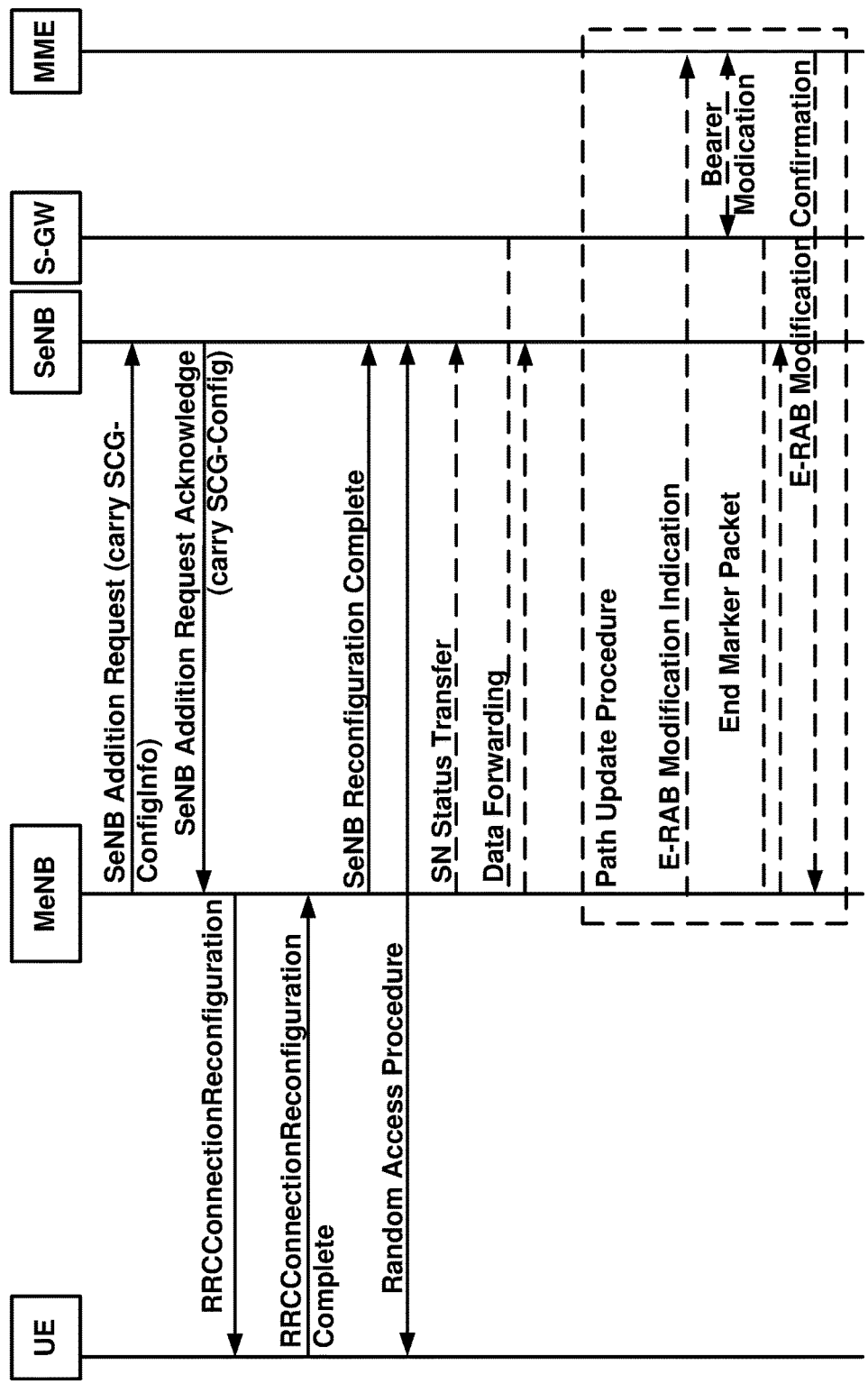
FIG. 12 is an example SeNB Addition procedure as per an aspect of an embodiment of the present disclosure.

In an example, the SeNB Addition procedure may be initiated by the MeNB. The SeNB addition procedure may be used to establish a UE context at the SeNB in order to provide radio resources from the SeNB to the UE. In an example, this procedure may be used to add at least the first cell (e.g., PSCell) of the SCG. FIG. 12 shows an example SeNB Addition procedure.

In an example, the MeNB may decide to request the SeNB to allocate radio resources for a specific E-RAB, indicating E-RAB characteristics (e.g., E-RAB parameters, TNL address information corresponding to bearer type). In an example, the MeNB may indicate within SCG-ConfigInfo the MCG configuration and the UE capabilities for UE capability coordination to be used as basis for the reconfiguration by the SeNB. In an example, the MeNB may not include SCG configuration. In an example, the MeNB may provide the latest measurement results for the SCG cell(s) requested to be added. In an example, the SeNB may reject the request.

In an example, for the split bearer option the MeNB may either decide to request resources from the SeNB of such an amount, that the QoS for the respective E-RAB is guaranteed by the exact sum of resources provided by the MeNB and the SeNB together, or even more. In an example, the MeNBs decision may be reflected by the E-RAB parameters signalled to the SeNB, which may differ from E-RAB parameters received over S1.

In an example, for a specific E-RAB, the MeNB may request the direct establishment of an SCG or a Split bearer, e.g., without first having to establish an MCG bearer.

In an example, if the RRM entity in the SeNB is able to admit the resource request, it may allocate respective radio resources and, dependent on the bearer option, respective transport network resources. In an example, the SeNB may triggers Random Access so that synchronization of the SeNB radio resource configuration may be performed. The SeNB may provide the new radio resource of SCG in SCG-Config to the MeNB. In an example, for SCG bearers, the SeNB may provide the new radio resource of the SCG together with S1 DL TNL address information for the respective E-RAB and security algorithm, for split bearers together with X2 DL TNL address information. In case of split bearers, transmission of user plane data may then take place. In an example, in case of SCG bearers, data forwarding and the SN Status Transfer may then take place.

In an example, if the MeNB endorses the new configuration, the MeNB may send the RRCConnectionReconfiguration message to the UE including the new radio resource configuration of SCG according to the SCG-Config.

In an example, the UE may apply the new configuration and may reply with RRCConnectionReconfigurationComplete message. In an example, in case the UE is unable to comply with (e.g., part of) the configuration included in the RRCConnectionReconfiguration message, it may perform the reconfiguration failure procedure.

In an example, the MeNB may inform the SeNB that the UE has completed the reconfiguration procedure successfully.

In an example, the UE may perform synchronization towards the PSCell of the SeNB. The order the UE sends the RRCConnectionReconfigurationComplete message and performs the Random Access procedure towards the SCG may be based on UE implementation. In an example, the successful RA procedure towards the SCG may not be required for a successful completion of the RRC Connection Reconfiguration procedure.

In an example, in case of SCG bearers, and dependent on the bearer characteristics of the respective E-RAB, the MeNB may take actions to minimize service interruption due to activation of dual connectivity (e.g., Data forwarding, SN Status Transfer). In an example, for SCG bearers, the update of the UP path towards the EPC may be performed.

In an example, the SeNB Modification procedure may be initiated either by the MeNB or by the SeNB and may be used to modify, establish or release bearer contexts, to transfer bearer contexts to and from the SeNB or to modify other properties of the UE context within the same SeNB. The SeNB modification procedure may not necessarily need to involve signalling towards the UE.

Figure 13:
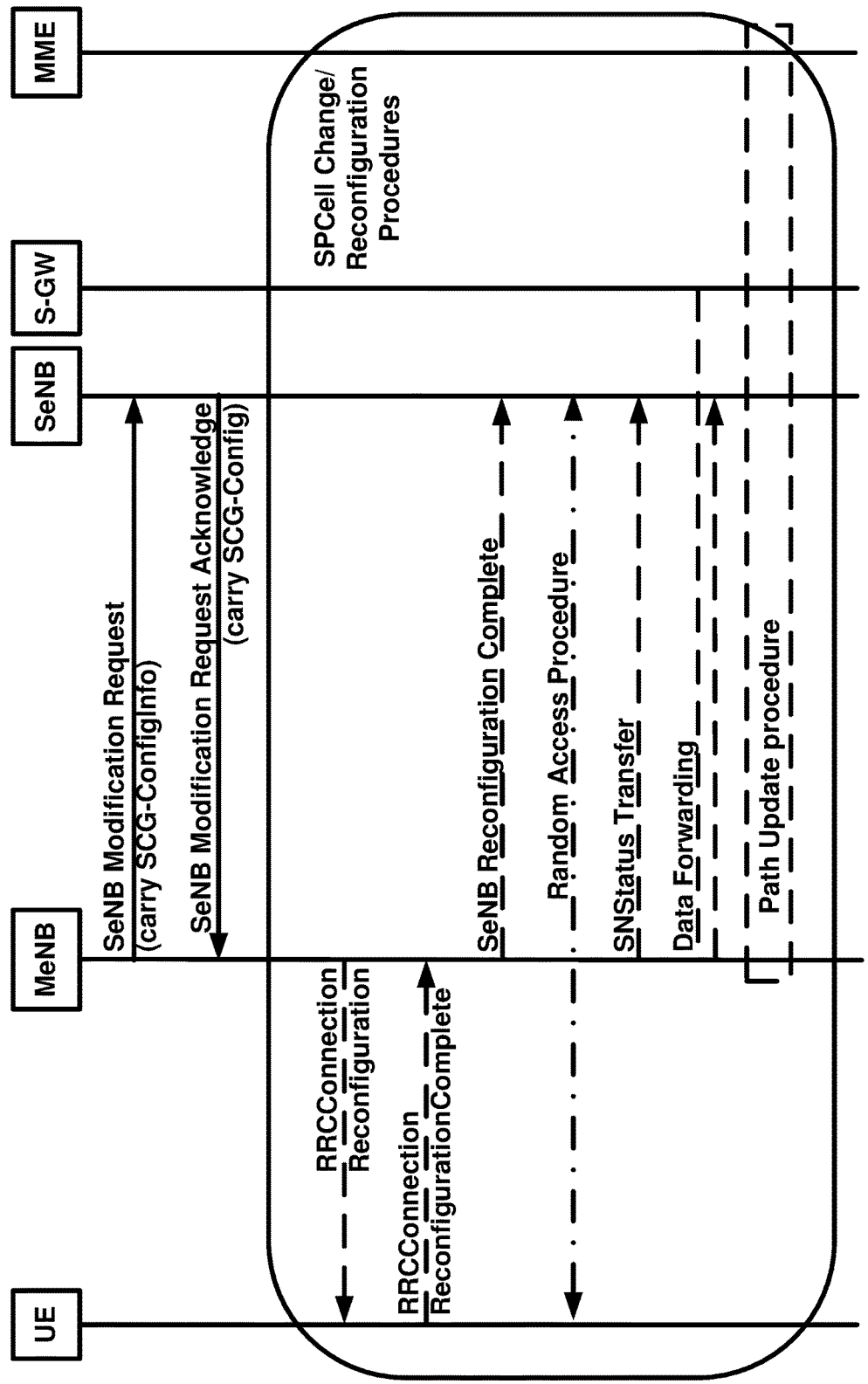
FIG. 13 is an example MeNB initiated SeNB Modification procedure as per an aspect of an embodiment of the present disclosure.

In an example, the MeNB may use the MeNB initiated SeNB Modification procedure to initiate configuration changes of the SCG within the same SeNB, e.g. the addition or release of SCG SCells, the addition, modification or release of SCG bearer(s) and the SCG part of split bearer(s) and to trigger PSCell change involving PSCell release. The SeNB may reject the request. In an example, SeNB may not reject the request if it concerns the release of SCG cells, of SCG bearer(s) or the SCG part of split bearer(s). FIG. 13 shows an example signalling flow for a MeNB initiated SeNB Modification procedure.

In an example, the MeNB may send an SeNB Modification Request message, which may contain bearer context related or other UE context related information, data forwarding address information (for example, if applicable) and SCG-ConfigInfo IE which may contain the MCG configuration and the entire UE capabilities for UE capability coordination that may be used as basis for the reconfiguration by the SeNB. In an example, in case of SCG SCell addition request, the MeNB may provide the latest measurement results for the SCG cell(s) requested to be added and SCG serving cell(s). In an example, in case of SCG Change, SCG Change Indication may be included.

In an example, the MeNB may request the establishment or release of SCG or Split bearer while not reconfiguration to MCG bearer, which may be performed without SCG change. In an example, the SeNB may respond with the SeNB Modification Request Acknowledge message, which may contain radio configuration information within SCG-Config message and data forwarding address information (in an example, if applicable). In an example, the SeNB may not initiate an SCG change. In an example, the SCG-Config message may indicate an SCG Change if the MeNB included the SCG Change Indication in the SeNB Modification Request message (as, in an example, an SCG change initiated by the SeNB may subsequently require an SCG counter from the MeNB). In an example, in case of SCG Change, for E-RABs configured with the split bearer option for which no bearer type change is performed, the SeNB may provide a new DL GTP TEID to the MeNB. In an example, the MeNB may continue sending DL PDCP PDUs to the SeNB with the previous DL GTP TEID until, in an example, it performs PDCP re-establishment or PDCP data recovery, and use the new DL GTP TEID starting with the PDCP re-establishment or data recovery.

In an example, the MeNB may initiate the RRC connection reconfiguration procedure. The UE may apply the new configuration and replies with RRCConnectionReconfigurationComplete. In an example, in case the UE may not comply with (e.g., part of) the configuration included in the RRCConnectionReconfiguration message, it may perform the reconfiguration failure procedure. In an example, upon successful completion of the reconfiguration, the success of the procedure may be indicated in the SeNB Reconfiguration Complete message. In an example, if instructed, the UE may perform synchronization towards the PSCell of the SeNB. In an example, the UE may perform UL transmission after having applied the new configuration. In an example, if applicable, data forwarding between MeNB and the SeNB may take place (FIG. 13 depicts an example case where a bearer context is transferred from the MeNB to the SeNB). In an example, if applicable, a path update may be performed.

Figure 14:
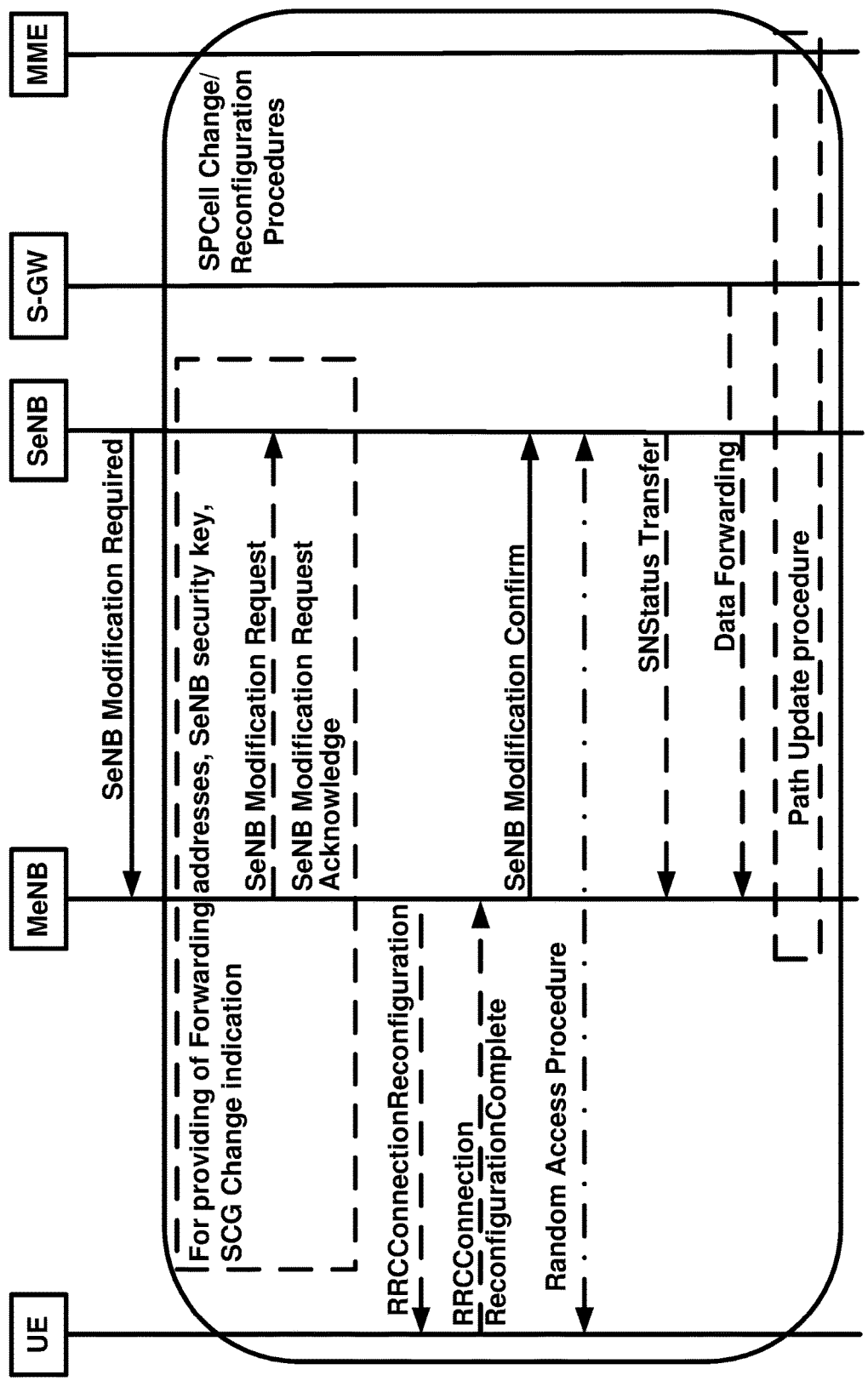
FIG. 14 is an example SeNB initiated SeNB Modification procedure as per an aspect of an embodiment of the present disclosure.

In an example, the SeNB may initiate and use the SeNB initiated SeNB Modification procedure to perform configuration changes of the SCG within the same SeNB, e.g. to trigger the release of SCG SCell(s) (in an example, SCG SCell(s) other than PSCell), SCG bearer(s) and the SCG part of split bearer(s) (e.g., upon which the MeNB may release the bearer or reconfigure it to an MCG bearer), and to trigger PSCell change. In an example, the MeNB may not reject the release request of SCG SCells (in an example, SCG SCell(s) other than PSCell), SCG bearer and/or the SCG part of split bearer. In an example, the SeNB may not initiate an SCG SCell addition except for the case of SI update of an SCG SCell. FIG. 14 shows an example signalling flow for an SeNB initiated SeNB Modification procedure.

In an example, the SeNB may send the SeNB Modification Required message, which may contain bearer context related, other UE context related information and SCG-Config message which may contain the new radio resource configuration of SCG. For bearer release or modification a corresponding E-RAB list may be included in the SeNB Modification Required message. In an example, in case of SCG Change, SCG Change Indication together with SCG-Config may be included. In an example, in case of release of bearer served by SeNB, SCG-Config may not be included. In an example, the SeNB may decide whether the Random Access procedure is required, e.g., SCG change.

In an example, if data forwarding and/or SeNB security key change needs to be applied, the MeNB may trigger the preparation of the MeNB initiated SeNB Modification procedure and provides forwarding address and/or a new SeNB security key information within the SeNB Modification Request message, respectively. In an example, if the SeNB requested to release a bearer, and the MeNB decides to reconfigure it to an MCG bearer, the MeNB may provide the SCG Change Indication within the SeNB Modification Request message and the SeNB may provide respective RRC information in the SCG-Configuration within the SeNB Modification Request Acknowledgement message.

In an example, when the SeNB Modification Required message contains SCG-Config, the following MeNB initiated SeNB Modification procedure triggered by the MeNB may not be used for anything that would require a new SCG configuration (as, in an example, SCG-Config may not be subsequently signalled by the SeNB).

In an example, if only SeNB security key (e.g., without SCG Change Indication) is provided, the MeNB may not need to wait for MeNB initiated SeNB Modification (e.g., SeNB Modification Request message from MeNB) to initiate the RRC connection reconfiguration procedure.

In an example, if MeNB accepts the SeNB request, the MeNB may send the RRCConnectionReconfiguration message to the UE including the new radio resource configuration of SCG according to the SCG-Config.

In an example, the UE may apply the new configuration and may reply the RRCConnectionReconfigurationComplete message. In an example, in case the UE may not comply with (in an example, part of) the configuration included in the RRCConnectionReconfiguration message, it may perform the reconfiguration failure procedure. In an example, upon successful completion of the reconfiguration, the success of the procedure related to SCG-Config may be indicated in the SeNB Modification Confirm message. In an example, if instructed, the UE may perform synchronization towards the PSCell of the SeNB. Otherwise, the UE may perform UL transmission after having applied the new configuration. In an example, if applicable, data forwarding between MeNB and the SeNB may takes place (FIG. 14 depicts an example case where a bearer context may be transferred from the SeNB to the MeNB). In an example, if applicable, a path update is performed.

Figure 15:
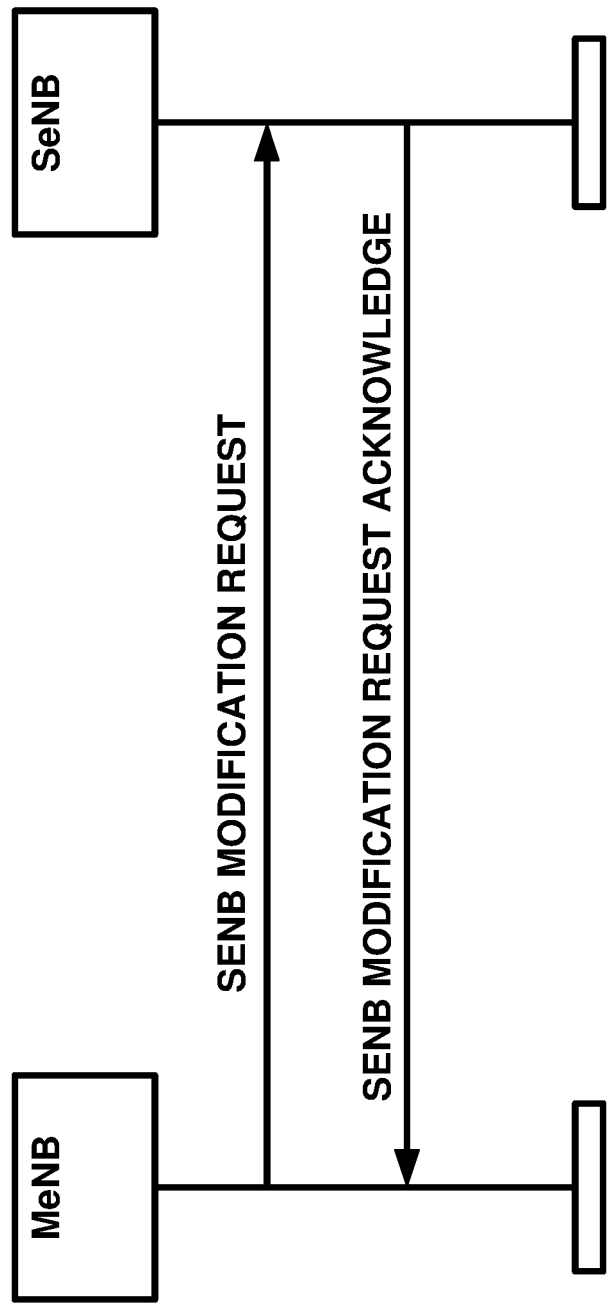
FIG. 15 is an example MeNB initiated SeNB Modification procedure with successful operation as per an aspect of an embodiment of the present disclosure.

In an example, an MeNB initiated SeNB Modification procedure may be used to enable an MeNB to request an SeNB to modify the UE context at the SeNB. In an example, the procedure may use UE-associated signalling. An example procedure is shown in FIG. 15.

Figure 16:
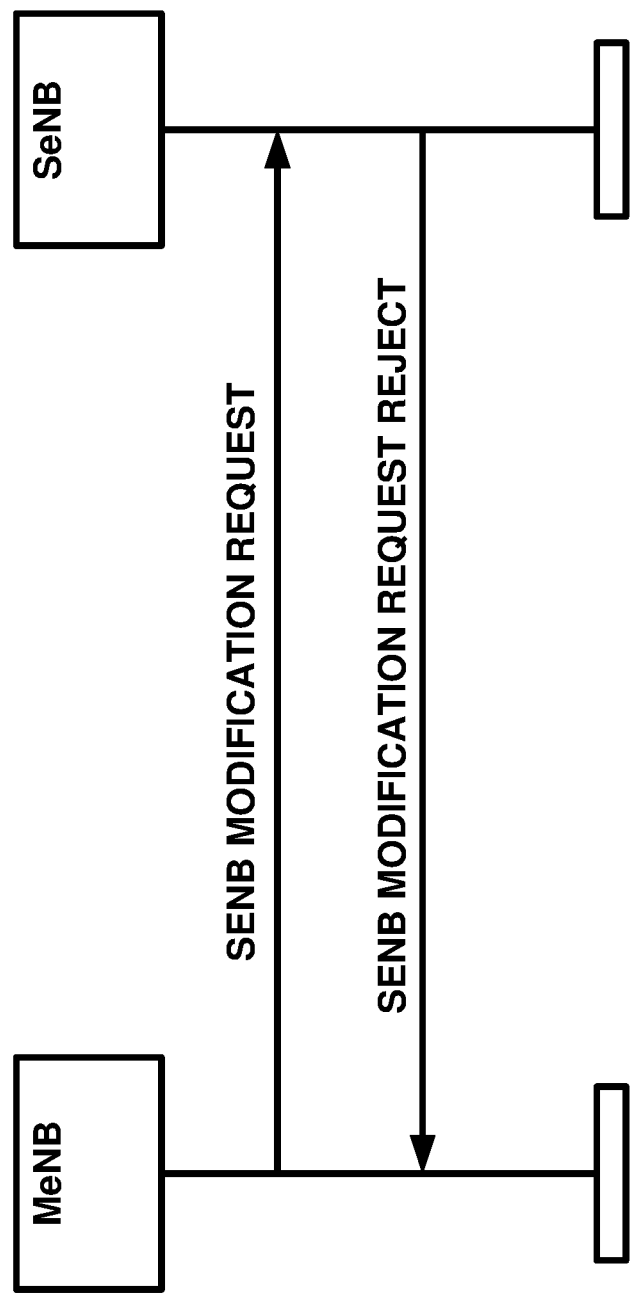
FIG. 16 is an example MeNB initiated SeNB Modification procedure with unsuccessful operation as per an aspect of an embodiment of the present disclosure.

In an example, if the SeNB does not admit any modification requested by the MeNB, or a failure occurs during the MeNB initiated SeNB Modification Preparation, the SeNB may send the SENB MODIFICATION REQUEST REJECT message to the MeNB. The message may contain the Cause IE with an appropriate value. An example procedure is shown in FIG. 16.

Figure 17:
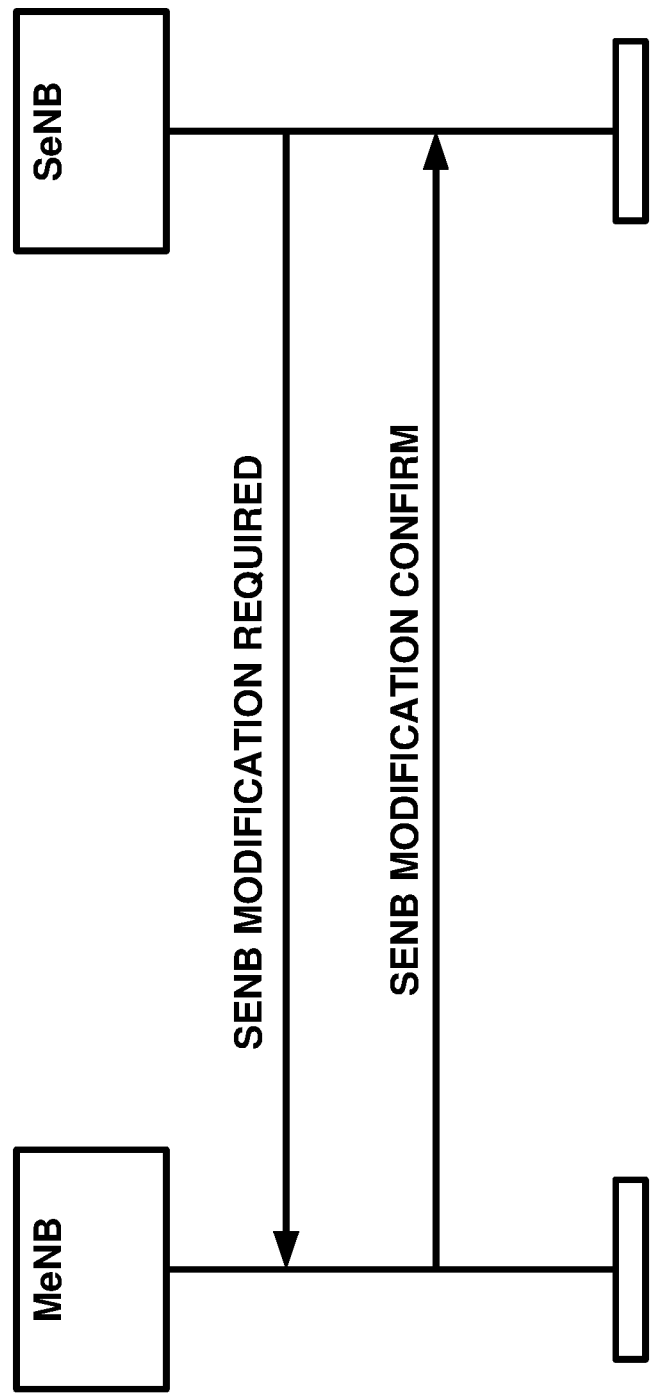
FIG. 17 is an example SeNB initiated SeNB Modification procedure with successful operation as per an aspect of an embodiment of the present disclosure.

In an example, the SeNB initiated SeNB Modification procedure may be used by the SeNB to modify the UE context in the SeNB. In an example, the procedure may use UE-associated signalling. In an example, the SeNB may initiate the procedure by sending the SENB MODIFICATION REQUIRED message to the MeNB. When the SeNB sends the SENB MODIFICATION REQUIRED message, it may start the timer $T_{DCoverall}$. An example is shown in FIG. 17.

Figure 18:
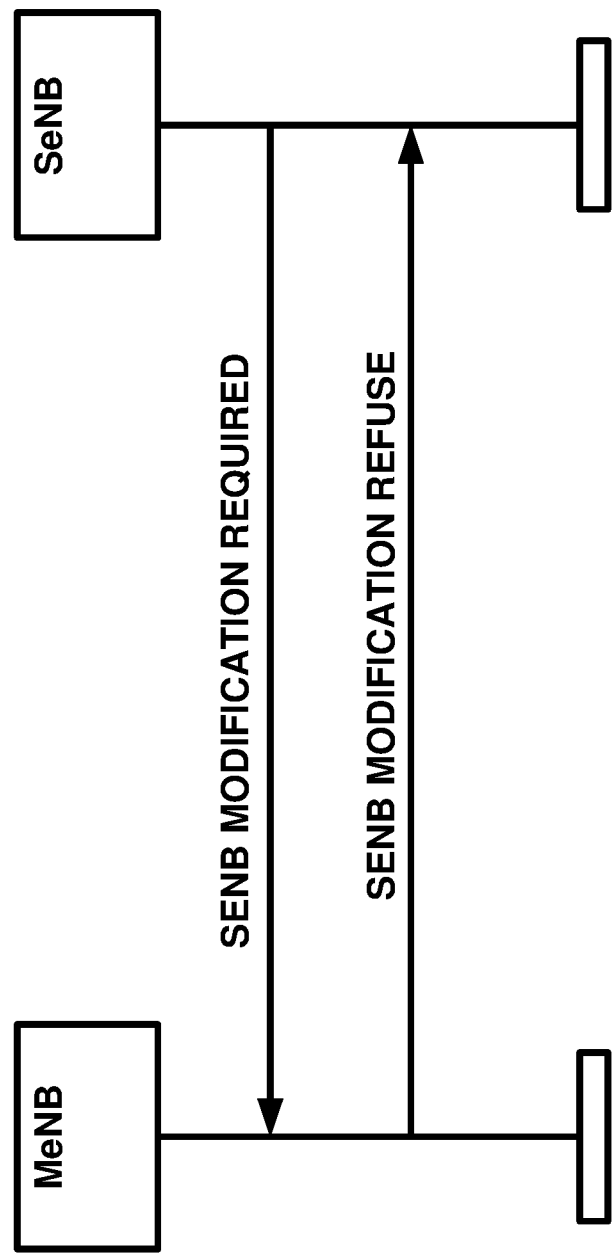
FIG. 18 is an example SeNB initiated SeNB Modification procedure with unsuccessful operation as per an aspect of an embodiment of the present disclosure.

In an example, in case the request modification cannot be performed successfully the MeNB may respond with the SENB MODIFICATION REFUSE message to the SeNB with an appropriate cause value in the Cause IE. An example procedure is shown in FIG. 18.

In an example, a handover procedure may be performed to change the serving cell of a UE in RRC_CONNECTED state. In an example handover procedure, the UE context within the source eNB may contain information regarding roaming and access restrictions which were provided either at connection establishment or at the last TA update. In an example, the source eNB may configure the UE measurement procedures according to the roaming and access restriction information and e.g. the available multiple frequency band information. Measurements provided by the source eNB may assist the function controlling the UE's connection mobility. In an example, a MEASUREMENT REPORT may be triggered and sent to the eNB. The source eNB may make decision based on MEASUREMENT REPORT and RRM information to hand off the UE. In an example, the source eNB may issue a HANDOVER REQUEST message to the target eNB passing necessary information to prepare the HO at the target side (e.g., UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF recovery). UE X2/UE S1 signalling references may enable the target eNB to address the source eNB and the EPC. The E-RAB context may include necessary RNL and TNL addressing information, and QoS profiles of the E-RAB s.

In an example, admission Control may be performed by the target eNB depending on the received E-RAB QoS information to increase the likelihood of a successful HO, if the resources can be granted by target eNB. The target eNB may configure the required resources according to the received E-RAB QoS information and reserves a C-RNTI and optionally a RACH preamble. The AS-configuration to be used in the target cell may either be specified independently (e.g., an establishment) or as a delta compared to the AS-configuration used in the source cell (e.g., a reconfiguration).

In an example, the target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. If RACH-less HO is configured, the container includes timing adjustment indication and optionally a preallocated uplink grant. The HANDOVER REQUEST ACKNOWLEDGE message may also include RNL/TNL information for the forwarding tunnels, if necessary. In an example, as soon as the source eNB receives the HANDOVER REQUEST ACKNOWLEDGE, or as soon as the transmission of the handover command is initiated in the downlink, data forwarding may be initiated.

In an example embodiment, radio resource status information of an unlicensed/LAA cell using unlicensed spectrum may indicate status information reflecting resource usages of other networks sharing the unlicensed spectrum to a neighbor eNB. In an example, a base station or a wireless device may receive or transmit packets via an unlicensed/LAA cell. The unlicensed spectrum may be shared with other networks, e.g. WLAN and/or other LTE networks. To share the unlicensed spectrum with other networks, an eNB may employ a listen before talk (LBT) procedure. The eNB may detect energy level from other transmitters/networks on an unlicensed/LAA cell before transmitting packets. In an example, if the energy level detected is higher than a threshold, the eNB may not transmit packets. The reporting of radio resource status of an unlicensed/LAA cell requires additional information, which is not supported by existing resource status report procedures. The legacy resource status report procedures provide neither information of radio resources that are not available because of other networks nor competition level for radio resources between networks and/or LBT parameters related to LBT processes associated with a base station (e.g., in downlink or uplink). Example embodiment enhance the processes and content of resource status information between base station through X2 interface. The enhanced resource status information process may be used to enhance SeNB addition procedure and/SeNB modification procedure and/or handover procedure.

Figure 19:
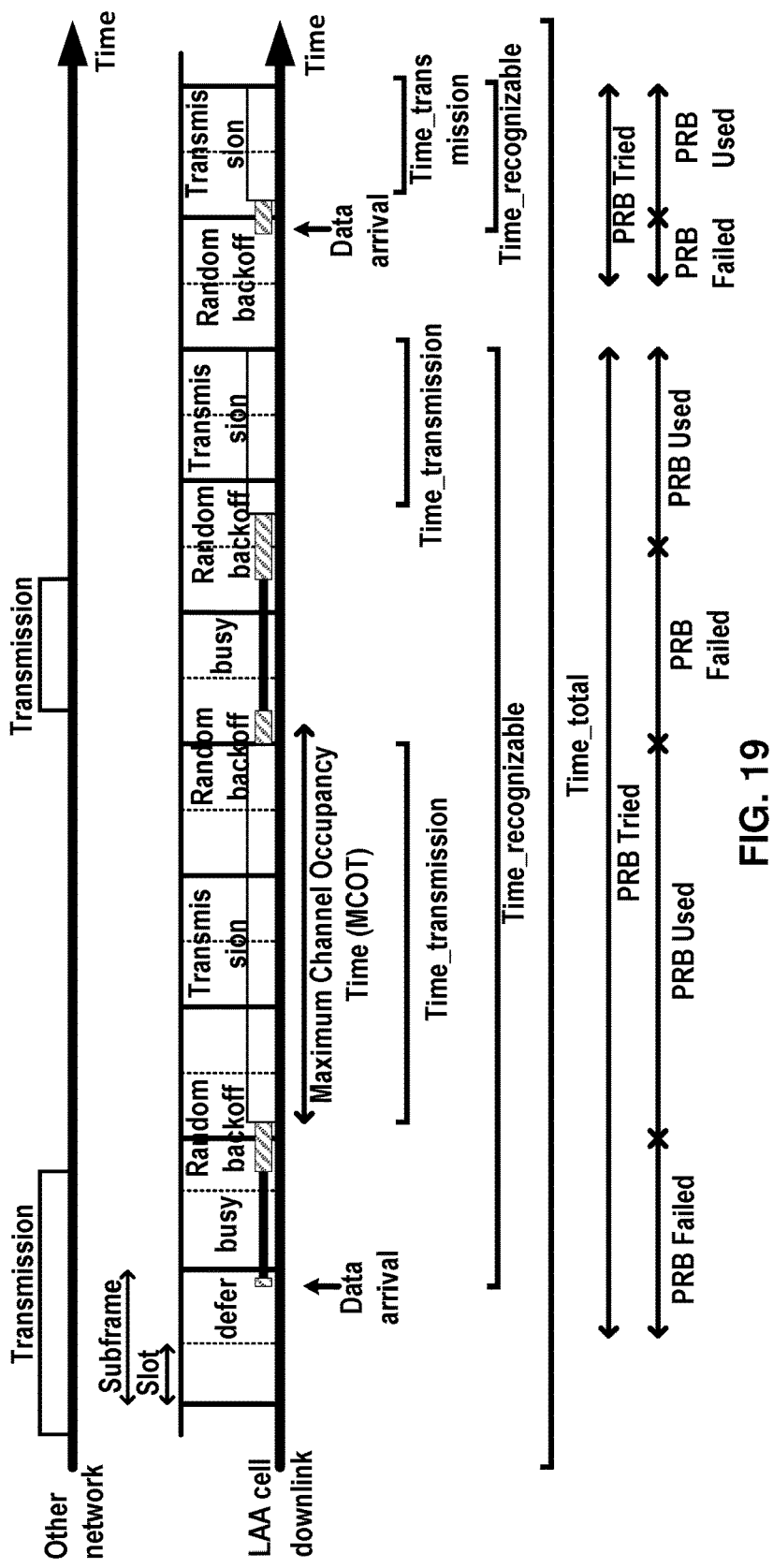
FIG. 19 is an example unlicensed/LAA cell downlink transmission as per an aspect of an embodiment of the present disclosure.
Figure 20:
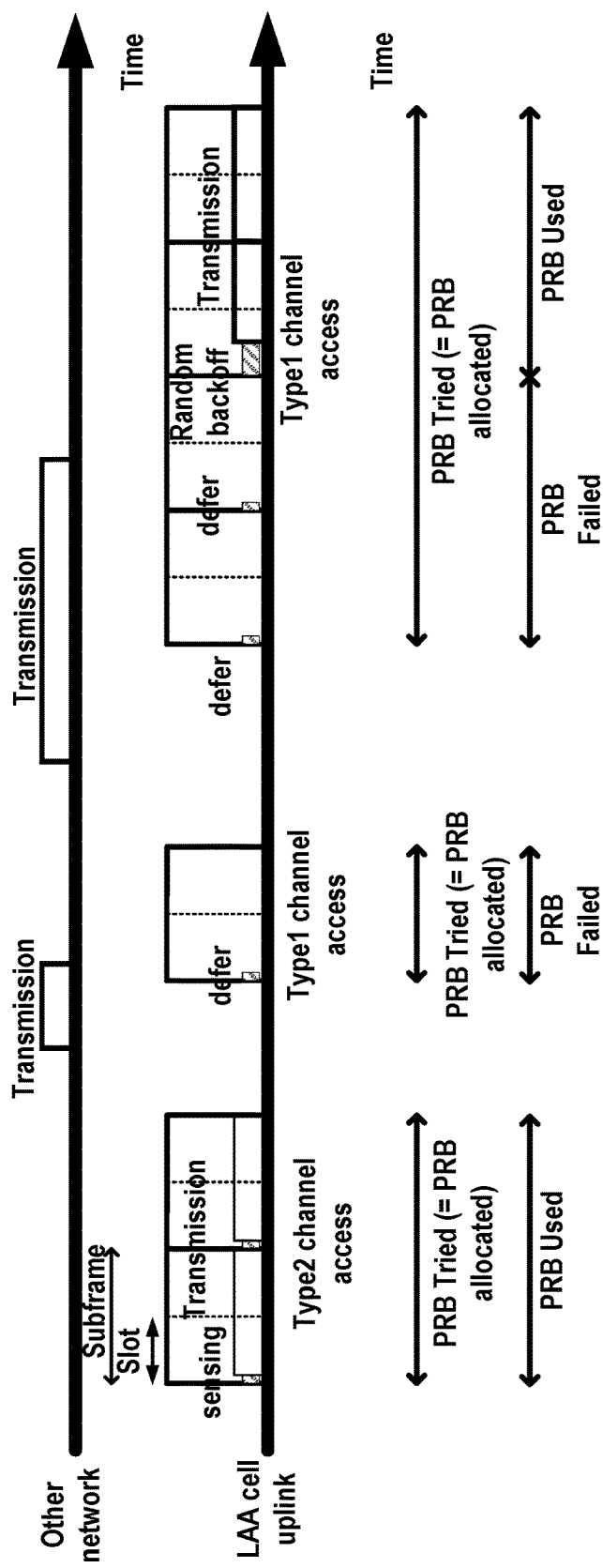
FIG. 20 is an example unlicensed/LAA cell uplink transmission as per an aspect of an embodiment of the present disclosure.

In an example embodiment, an eNB may collect radio resource status for its unlicensed/LAA cell, and may transmit the radio resource status information to its neighbor eNBs. In an example, the radio resource status information may comprise LBT Failure information, LBT Success information, PRB/subframes Tried, PRB/subframes Failed, PRB/subframes Used, PRB/subframes Usage, Contention Level, Average CW, Current CW, subframe used, subframe interfered and/or absenceOfAnyOtherTechnology for the unlicensed/LAA cell. In an example, the absenceOfAnyOtherTechnology may indicate absence or presence of any other network sharing a frequency band used by the unlicensed/LAA cell of the message sending eNB. In an example, the LBT Failure information, the LBT Success information, the PRB/Subframe Tried, the PRB/Subframe Failed, the PRB/Subframe Used, and/or the PRB/Subframe Usage may be calculated in the time domain and/or in the time-frequency domain. Example downlink transmission on an LAA/unlicensed cell is shown in FIG. 19. Example uplink transmission on an LAA/unlicensed cell is shown in FIG. 20. In an example, in case of calculating in time domain, if one or more frequency domain resource blocks (PRBs) in a time slot are used for packet transmission, the time slot may be considered as used. In an example, if packet transmission starts or ends at the middle of a PRB (slot), the PRB may be considered as used. In an example, if packet transmission starts or ends at the middle of a PRB (slot), the PRB may be considered as failed.

In an example, the Contention Level may comprise one or more parameters indicating a level of contention on the unlicensed spectrum of the unlicensed/LAA cell (e.g. one or more of high contention, low contention; high contention, medium contention, low contention; or high contention, high medium contention, medium contention, low medium contention, low contention). For example, if the unlicensed spectrum is highly occupied by other networks (e.g. if a failure ratio in transmission attempts by the unlicensed/LAA cell is higher than a threshold, wherein the failure may occur because one or more other networks are transmitting through the unlicensed spectrum shared with the unlicensed/LAA cell), the Contention Level may be the high contention. For example, if the unlicensed spectrum is rarely occupied by other networks (e.g. if the failure ratio in transmission attempts by the unlicensed/LAA cell is lower than a threshold), the Contention Level may be the low contention.

In an example embodiment, the LBT Failure information may comprise a ratio of the number of PRBs/subframes that the unlicensed/LAA cell tried to use for packet transmission but failed because of other networks' transmissions to the number of PRBs/subframes that the unlicensed/LAA cell used for packet transmission or tried to use but failed because of other networks' transmissions during a measurement period during which resource status measurements are performed. For example, LBT Failure Ratio(T) may be ratio of number of PRBs/sub frames failed in packet transmission (T) to (sum of number of PRBs/sub frames used for packet transmission(T) and number of PRBs/sub frames failed in packet transmission(T)), where T is the measurement period. In an example, for uplink transmission, the number of PRBs/subframes used for packet transmission or failed may be equivalent to the number of PRBs/subframes allocated for uplink transmission. In an example, for uplink transmission, a UE may report information of PRBs failed to use because of other networks' transmission to its serving eNB. In an example, for uplink transmission, an eNB may consider PRBs/subframes that the eNB allocated to a UE for uplink transmission but could not receive packets through as PRBs/subframes failed in packet transmission. In an example, the LBT Failure information may be provided for downlink transmissions, for uplink transmission, and/or for transmissions including both downlink and uplink transmissions.

In an example embodiment, the LBT Success information may comprise a ratio of the number of PRBs/subframes that the unlicensed/LAA cell used for packet transmission to the number of PRBs/subframes that the unlicensed/LAA cell used for packet transmission or tried to use but failed because of other networks' transmissions during the measurement period. For example, LBT Success Ratio(T) may be ratio of number of PRBs/subframes used for packet transmission(T) to (sum of number of PRBs/subframes used for packet transmission(T) and number of PRBs/subframes failed in packet transmission(T)), where T is the measurement time period. In an example, for uplink transmission, the number of PRBs/subframes used for packet transmission or failed may be equivalent to the number of PRBs/subframes allocated for uplink transmission. In an example, for uplink transmission, a UE may report information of PRBs/subframes used for packet transmission to its serving eNB. In an example, for uplink transmission, an eNB may consider PRBs that the eNB received packets through as PRBs/subframes used for packet transmission. In an example, the LBT Failure information may be provided for downlink transmissions, for uplink transmission, and/or for transmissions including both downlink and uplink transmissions.

In an example embodiment, the PRB/subframes Tried may comprise a ratio of the number of PRBs/subframes that the unlicensed/LAA cell used for packet transmission or tried to use but failed because of other networks' transmissions to the number of PRBs/subframes available during the measurement period. For example, PRB Tried(T) may be the ratio of (sum of number of PRBs/subframes used for packet transmission(T) and number of PRBs/subframes f ailed in packet transmission(T)) to number of PRBs/subframes available(T), where T is the measurement period. In an example, for uplink transmission, the number of PRBs/subframes used for packet transmission or failed may be equivalent to the number of PRBs/subframes allocated for uplink transmission. In an example, the PRB/subframes Tried may be provided for downlink transmissions, for uplink transmission, and/or for transmissions including both downlink and uplink transmissions.

In an example embodiment, the PRB/subframes Failed may comprise a ratio of the number of PRBs/subframes that the unlicensed/LAA cell tried to use for packet transmission but failed because of other networks' transmissions to the number of PRBs available during the measurement time period. For example, PRB Failed(T) may be the ratio of number of PRBs/subframes f ailed in packet transmission(T) to number of PRBs/subframes available(T), where T is the measurement time period. In an example, for uplink transmission, a UE may report information of PRBs/subframes failed to use because of other networks' transmission to its serving eNB. In an example, for uplink transmission, an eNB may consider PRBs/subframes that the eNB allocated to a UE for uplink transmission but could not receive packets through as PRBs failed in packet transmission. In an example, the PRB/subframes Failed may be provided for downlink transmissions, for uplink transmission, and/or for transmissions including both downlink and uplink transmissions.

In an example embodiment, the PRB/subframes Used may comprise a ratio of the number of PRBs/subframes that the unlicensed/LAA cell used for packet transmission to the number of PRBs/subframes available during the measurement time period. For example, PRB Used(T) may be the ratio of number of PRBs/subframes used for packet transmission(T) to number of PRBs/subframes available(T), where T is the measurement period. In an example, for uplink transmission, a UE may report information of PRBs/subframes used for packet transmission to its serving eNB. In an example, for uplink transmission, an eNB may consider PRBs that the eNB received packets through as PRBs/subframes used for packet transmission. In an example, the PRB/Subframe Used may be provided for downlink transmissions, for uplink transmission, and/or for transmissions including both downlink and uplink transmissions.

In an example embodiment, the PRB/subframes Usage may comprise Downlink PRB/subframes Usage and/or Uplink PRB/subframes Usage. In an example, the Downlink PRB/subframes Usage may comprise a ratio of the number of PRBs/subframes that the unlicensed/LAA cell used for downlink packet transmission to the number of PRBs/subframes available during the measurement time period. For example, Downlink PRB Usage(T) may be the ratio of number of PRBs used for downlink packet transmission(T) to number of PRBs available(T), where T is the measurement time period. In an example, the Uplink PRB/subframes Usage may comprise a ratio of the number of PRBs/subframes that the unlicensed/LAA cell used for uplink packet transmission or tried to use for uplink packet transmission but failed because of other networks' transmissions to the number of PRBs/subframes available during the measurement time period. For example, Uplink PRB Usage (T) may be the ratio of (sum of number of PRBs/subframes used for uplink packet transmission(T) and number of PRBs/subframes failed in uplink packet transmission(T)) to number of PRBs/subframes available(T), where T is the measurement time period. In an example, for the Uplink PRB/subframes Usage, the number of PRBs used for uplink packet transmission or failed may be equivalent to the number of PRBs/subframes allocated for uplink transmission.

In an example, the Average CW may comprise average contention window sizes of a channel access priority class (e.g. $CW_{p=1}$, $CW_{p=2}$, $CW_{p=3}$, and/or $CW_{p=4}$) for a measurement time period during which status measurements are performed and/or total average contention window size of channel access priority classes for the measurement time period. In an example, the average contention window size may be calculated by averaging contention window sizes used in every channel access procedure for transmission during the measurement time period for a channel access priority class. For example, average contention window $size_p(T)$ may be the ratio of sum of contention window sizes for each transmission$_p$(T) to number of all transmissions$_p$ (T), where T is the measurement period, and p is the channel access priority class, e.g. p=1, 2, 3, or 4. In an example, the total average contention window size may be calculated by averaging contention window sizes used in every channel access procedure for transmission for channel access priority class during the measurement time period. For example, total average contention window size(T) may be the ratio of $\Sigma_{p=1}^{4}$ sum of contention window sizes for each transmission$_p$(T) to $\Sigma_{p=1}^{4}$ number of all transmissions$_p$(T). In an example, the Average CW may be provided for downlink transmissions, for uplink transmission, and/or for transmissions including both downlink and uplink transmissions. In an example, uplink transmissions using the type 2 UL channel access procedure are excluded in calculation of the Average CW.

In an example embodiment, the Current CW may comprise current contention window sizes for a channel access priority class (e.g. $CW_{p=1}$, $CW_{p=2}$, $CW_{p=3}$, and/or $CW_{p=4}$) and/or total current contention window size of channel access priority classes. In an example, the current contention window size for a channel access priority class may be a contention window size that the unlicensed/LAA cell is currently using for packet transmission of the channel access priority class. In an example, the total current contention window size may be calculated by averaging the current contention window sizes for a channel access priority class. For example, otal current contention window size may be the ratio of $\Sigma_{p=1}^{4}$ current contention window size$_p$ to number of channel access priority classes, where the number of channel access priority classes may be 4. In an example, the Current CW may be provided for downlink transmissions, for uplink transmission, and/or for transmissions including both downlink and uplink transmissions. In an example, uplink transmissions using the type 2 UL channel access procedure are excluded in calculation of the Current CW.

In an example embodiment, in response to receiving the radio resource status information of a neighbor unlicensed/LAA cell from its neighbor eNB controlling the neighbor unlicensed/LAA cell, an eNB may determine its further operation at least based on one or more elements of the radio resource status information. In an example, the eNB may configure its operation parameters (e.g. unlicensed/LAA cell configuration parameters, mobility parameters, dual connectivity parameters, load balancing parameters, interference control parameters, UE measurement configuration parameters, and/or other cell or UE control parameters) at least based on one or more elements of the radio resource status information.

In an example embodiment, an eNB may make a handover decision for a UE at least based on one or more elements of the radio resource status information received from a neighbor eNB. For example, if the LBT Failure information, the PRB/subframes Tried, the PRB/subframes Failed, the PRB/subframes Used, the PRB/subframes Usage, the Contention Level, the Average CW, and/or the Current CW are higher than a threshold, and/or if the LBT Success information is lower than a threshold, the eNB may reduce handover initiations of UEs towards the neighbor eNB operating the corresponding unlicensed/LAA cell. For example, if the LBT Failure information, the PRB/Subframe Tried, the PRB/Subframe Failed, the PRB/Subframe Used, the PRB/Subframe Usage, the Contention Level, the Average CW, and/or the Current CW are lower than a threshold, and/or if the LBT Success information is higher than a threshold, the eNB may increase handover initiations of UEs towards the neighbor eNB operating the corresponding unlicensed/LAA cell. For example, even though the PRB/Subframe Used and/or the PRB/Subframe Usage are higher than a threshold, the eNB may not reduce handover initiations of UEs towards the neighbor eNB operating the corresponding unlicensed/LAA cell if the LBT Failure information, the PRB/Subframe Tried, the PRB/Subframe Failed, the Contention Level, the Average CW, and/or the Current CW is lower than a threshold, if the LBT Success information is higher than a threshold, and/or if the absenceOfAnyOtherTechnology indicates absence of any other network sharing the corresponding unlicensed spectrums. For example, even though the PRB/Subframe Used and/or the PRB/Subframe Usage are lower than a threshold, the eNB may not increase handover initiations of UEs towards the neighbor eNB operating the corresponding unlicensed/LAA cell if the LBT Failure information, the PRB/Subframe Tried, the PRB/Subframe Failed, the Contention Level, the Average CW, and/or the Current CW is higher than a threshold, if the LBT Success information is lower than a threshold, and/or if the absenceOfAnyOtherTechnology indicates presence of any other network sharing the corresponding unlicensed spectrums.

In an example embodiment, an eNB may make a dual connectivity initiation/modification decision for a UE at least based on one or more elements of the radio resource status information received from a neighbor eNB. For example, if the LBT Failure information, the PRB/Subframe Tried, the PRB/Subframe Failed, the PRB/Subframe Used, the PRB/Subframe Usage, the Contention Level, the Average CW, and/or the Current CW are higher than a threshold, and/or if the LBT Success information is lower than a threshold, the eNB may reduce offloading bearers of UEs towards the corresponding unlicensed/LAA cell of the neighbor eNB. For example, if the LBT Failure information, the PRB/Subframe Tried, the PRB/Subframe Failed, the PRB/Subframe Used, the PRB/Subframe Usage, the Contention Level, the Average CW, and/or the Current CW are lower than a threshold, and/or if the LBT Success information is higher than a threshold, the eNB may increase offloading bearers of UEs towards the corresponding unlicensed/LAA cell of the neighbor eNB. For example, even though the PRB/Subframe Used and/or the PRB/Subframe Usage are higher than a threshold, the eNB may not reduce offloading bearers of UEs towards the corresponding unlicensed/LAA cell of the neighbor eNB if the LBT Failure information, the PRB/Subframe Tried, the PRB/Subframe Failed, the Contention Level, the Average CW, and/or the Current CW is lower than a threshold, if the LBT Success information is higher than a threshold, and/or if the absenceOfAnyOtherTechnology indicates absence of any other network sharing the corresponding unlicensed spectrums. For example, even though the PRB/Subframe Used and/or the PRB/Subframe Usage are lower than a threshold, the eNB may not increase offloading bearers of UEs towards the corresponding unlicensed/LAA cell of the neighbor eNB if the LBT Failure information, the PRB/Subframe Tried, the PRB/Subframe Failed, the Contention Level, the Average CW, and/or the Current CW is higher than a threshold, if the LBT Success information is lower than a threshold, and/or if the absenceOfAnyOtherTechnology indicates presence of any other network sharing the corresponding unlicensed spectrums.

In an example embodiment, an eNB may update mobility parameters at least based on one or more elements of the radio resource status information received from a neighbor eNB. For example, if the LBT Failure information, the PRB/Subframe Tried, the PRB/Subframe Failed, the PRB/Subframe Used, the PRB/Subframe Usage, the Contention Level, the Average CW, and/or the Current CW are higher than a threshold, and/or if the LBT Success information is lower than a threshold, the eNB may change mobility parameters to reduce handover initiations towards the neighbor eNB operating the corresponding unlicensed/LAA cell, and/or the eNB may send a mobility change request message to the neighbor eNB to notify the updated mobility parameters. For example, if the LBT Failure information, the PRB/Subframe Tried, the PRB/Subframe Failed, the PRB/Subframe Used, the PRB/Subframe Usage, the Contention Level, the Average CW, and/or the Current CW are lower than a threshold, and/or if the LBT Success information is higher than a threshold, the eNB may change mobility parameters to increase handover initiations towards the neighbor eNB operating the corresponding unlicensed/LAA cell, and/or the eNB may send a mobility change request message to the neighbor eNB to notify the updated mobility parameters. For example, even though the PRB/Subframe Used and/or the PRB/Subframe Usage are higher than a threshold, the eNB may not change mobility parameters to reduce handover initiations towards the neighbor eNB operating the corresponding unlicensed/LAA cell if the LBT Failure information, the PRB/Subframe Tried, the PRB/Subframe Failed, the Contention Level, the Average CW, and/or the Current CW is lower than a threshold, if the LBT Success information is higher than a threshold, and/or if the absenceOfAnyOtherTechnology indicates absence of any other network sharing the corresponding unlicensed spectrums. For example, even though the PRB/Subframe Used and/or the PRB/Subframe Usage are lower than a threshold, the eNB may not change mobility parameters to increase handover initiations towards the neighbor eNB operating the corresponding unlicensed/LAA cell if the LBT Failure information, the PRB/Subframe Tried, the PRB/Subframe Failed, the Contention Level, the Average CW, and/or the Current CW is higher than a threshold, if the LBT Success information is lower than a threshold, and/or if the absenceOfAnyOtherTechnology indicates presence of any other network sharing the corresponding unlicensed spectrums.

In an example, the mobility parameters may comprise a3-Offset, a5-Threshold1, a5-Threshold2, hysteresis for a3 and/or a5 event, timeToTrigger for a3 and/or a5 event, filtercoefficient for a3 and/or a5 event, and/or cellIndividualOffset of a handover source cell and/or a handover target cell for a3 and/or a5 event.

Figure 21:
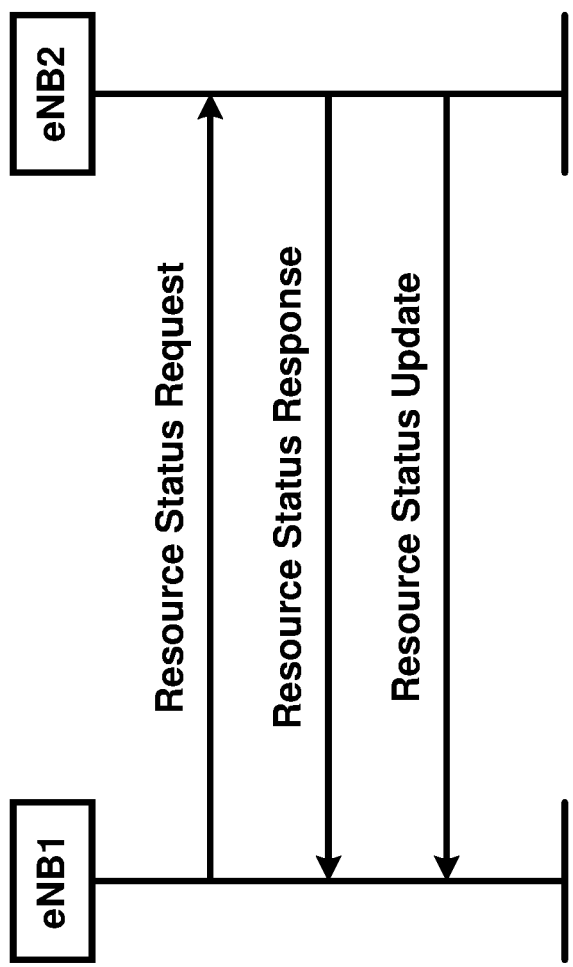
FIG. 21 is an example Resource Status Reporting Initiation and Resource Status Reporting procedure as per an aspect of an embodiment of the present disclosure.

In an example embodiment, a first eNB may transmit a first message to a second eNB. The second eNB may transmit a second message to the first eNB. The second eNB may transmit a third message to the first eNB. The second eNB may transmit more messages to the first eNB. An example is shown in FIG. 21. The first message, for example, may be a resource status request message, the second message may be a resource status response message, and the third message and the more messages may be a resource status update massage, wherein the first message, the second message, the third message, and the more messages may be exchanged as a part of a resource status reporting initiation procedure and a resource status reporting procedure. Through the first message, the first eNB may request reporting of load measurements to the second eNB. Through the second message, the second eNB may admit or reject the requests from the first eNB. Through the third message and the more messages, the first eNB may receive results of measurements admitted by the second eNB through the second message. In an example, the third message and/or the more messages may comprise the radio resource status information, wherein the radio resource status information may comprise the LBT Failure information, the LBT Success information, the PRB/Subframe Tried, the PRB/Subframe Failed, the PRB/Subframe Used, the PRB/Subframe Usage, the Contention Level, the Average CW, the Current CW, and/or the absenceOfAnyOtherTechnology for an unlicensed/LAA cell operated by the message sending eNB. In an example, a Radio Resource Status IE in the third message and/or the more messages may comprise the radio resource status information. In an example, after receiving the radio resource status information, the first eNB may initiate a UE handover, initiate/modify a dual connectivity of a UE, update mobility parameters, and/or initiate a mobility setting change procedure at least based on one or more elements of the radio resource status information.

Figure 22:
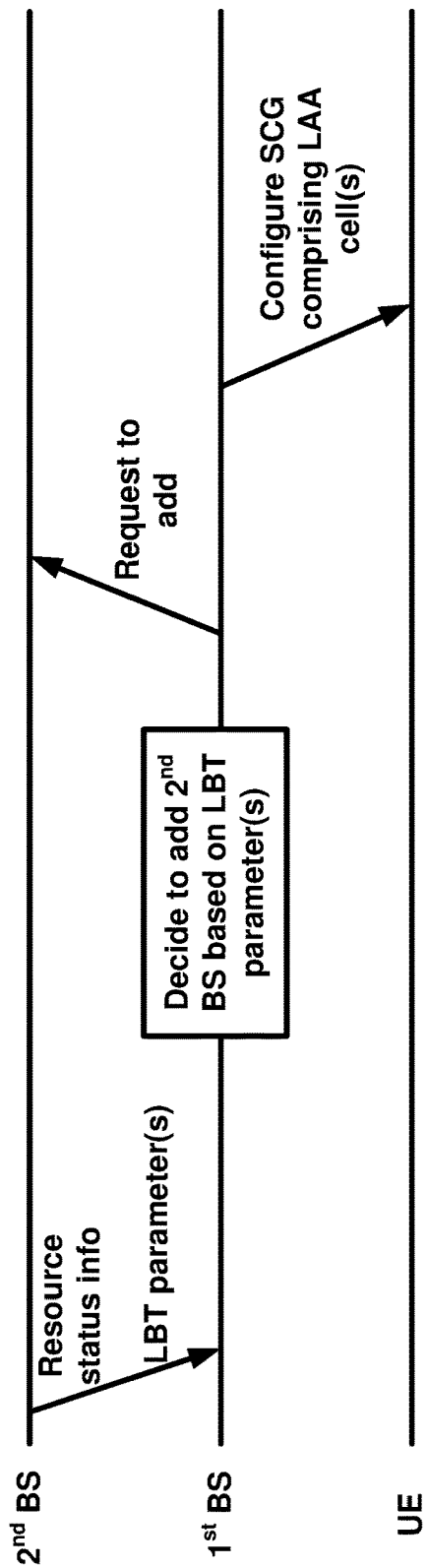
FIG. 22 is an example SeNB Addition procedure as per an aspect of an embodiment of the present disclosure.

In an example, a first base station may have an X2 interface to a second base station. The first base station may receive from the second base station an application protocol message through the X2 interface. An example is show in FIG. 22. The application protocol message may comprise one or more LBT parameters of one or more LBT processes associated with the second base station. In an example, the one or more LBT parameters may relate to LBT processes performed by the second base station on one or more LAA cells of the second base station. In an example, the one or more LBT processes may be performed by one or more UE communicating with the second base station via the one or more LAA cells. In an example, the one or more LBT processes may be performed by the second base station or by one or more UE communication with the second base station via the one or more LAA cells. In an example, the first base station may decide to add the second base station and use radio resources of the second base station for a bearer of the wireless device. The decision to add the second base station may be based on the one or more LBT parameters. The first base station may transmit a request to add the second base station to the first base station. The request to add message may be transmitted via the X2 interface. In an example, the second base station may transmit an acknowledge message confirming the request to add. The first base station may transmit (e.g., in response to receiving the confirmation message) a configuration message to a wireless device configuring a plurality of cells for communication of the wireless device and the second base station. The plurality of cells may be grouped as a secondary cell group (SCG). The SCG may comprise one or more LAA cells. The one or more LAA cells may comprise one or more of the one or more LAA cells for which the second base station transmitted the LBT parameters.

Figure 23:
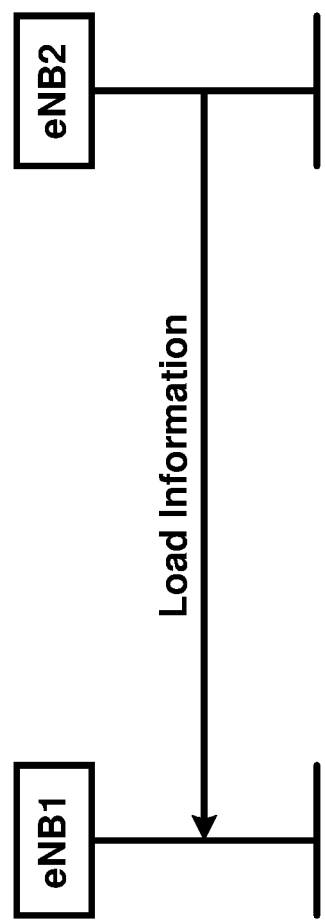
FIG. 23 is an example Load Information procedure as per an aspect of an embodiment of the present disclosure.

In an example embodiment, a first eNB may receive a load information message from a second eNB as a part of a load indication procedure. An example is shown in FIG. 23. Through a load indication procedure, a first eNB may receive load and/or interference coordination information between eNBs controlling intra-frequency neighboring cells and/or between eNBs controlling inter-frequency neighboring cells for TDD and/or unlicensed/LAA. In an example, the load information message may comprise the radio resource status information, wherein the radio resource status information may comprise the LBT Failure information, the LBT Success information, the PRB/Subframe Tried, the PRB/Subframe Failed, the PRB/Subframe Used, the PRB/Subframe Usage, the Contention Level, the Average CW, the Current CW, and/or the absenceOfAnyOtherTechnology for an unlicensed/LAA cell operated by the message sending eNB. In an example, after receiving the radio resource status information, the first eNB may initiate a UE handover, initiate/modify a dual connectivity of a UE, update mobility parameters, and/or initiate a mobility setting change procedure at least based on one or more elements of the radio resource status information.

Figure 24:
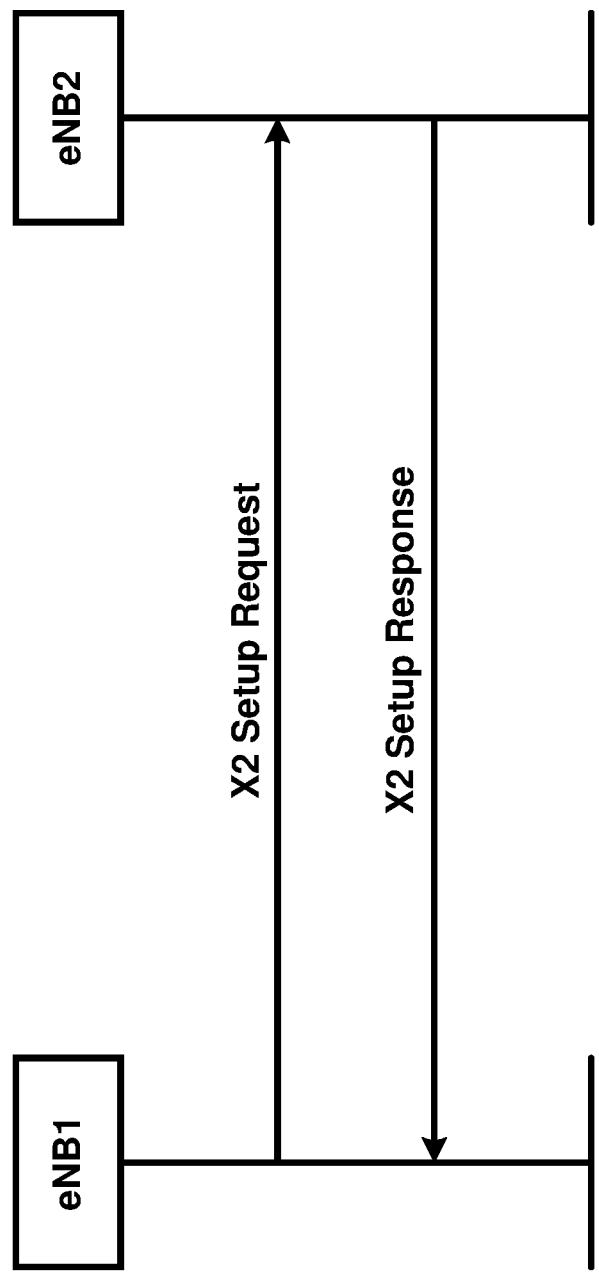
FIG. 24 is an example X2 setup procedure as per an aspect of an embodiment of the present disclosure.

In an example embodiment, a first eNB may transmit a first message to a second eNB. The second eNB may transmit a second message to the first eNB. An example is shown in FIG. 24. The first message, for example, may be an X2 setup request message, and the second message may be an X2 setup response message, wherein the first message and the second message may be exchanged as a part of an X2 setup procedure. Through the X2 setup procedure the first eNB and/or the second eNB may exchange application level configuration data needed to interoperate over an X2 interface between the two eNBs. The first eNB may transfer a list of its served cells and/or a list of supported GU Group Ids to the second eNB via the first message. The second eNB may reply with a list of its served cells and/or a list of supported GU Group Ids in the second message. In an example, the first message and/or the second message may comprise the radio resource status information, wherein the radio resource status information may comprise the LBT Failure information, the LBT Success information, the PRB/Subframe Tried, the PRB/Subframe Failed, the PRB/Subframe Used, the PRB/Subframe Usage, the Contention Level, the Average CW, the Current CW, and/or the absenceOfAnyOtherTechnology for an unlicensed/LAA cell operated by the message sending eNB. In an example, a served cell information IE in the X2 setup request message and/or the X2 setup response message may comprise the radio resource status information. In an example, after receiving the radio resource status information, the first eNB and/or the second eNB may initiate a UE handover, initiate/modify a dual connectivity of a UE, update mobility parameters, and/or initiate a mobility setting change procedure at least based on one or more elements of the radio resource status information.

Figure 25:
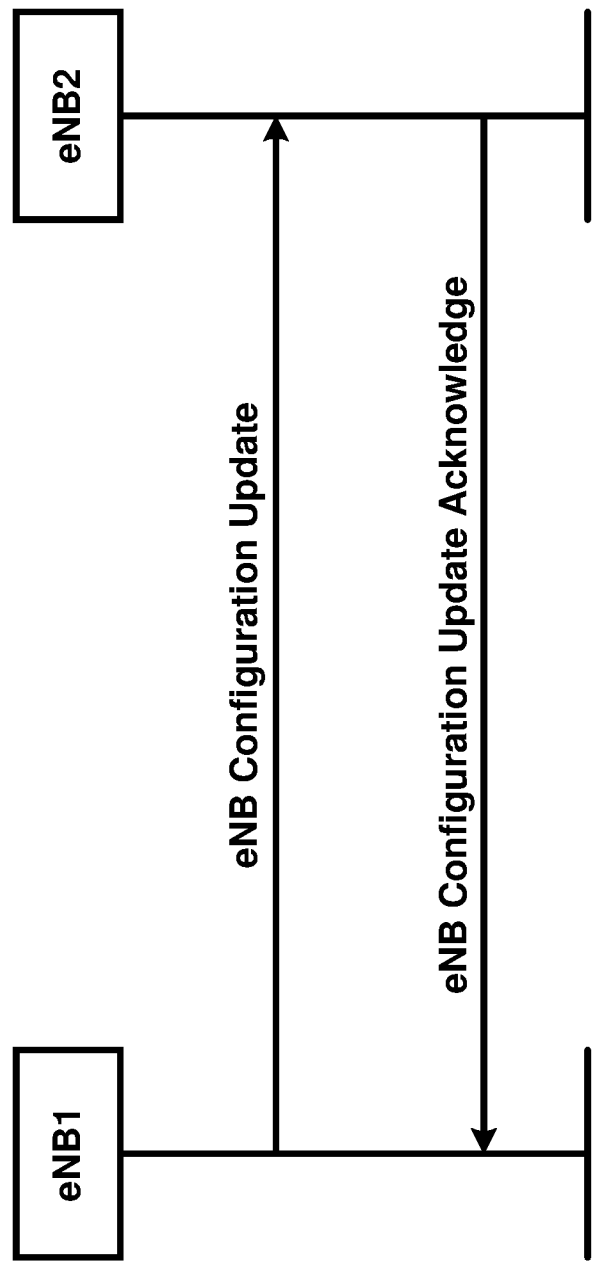
FIG. 25 is an example eNB configuration update procedure as per an aspect of an embodiment of the present disclosure.

In an example embodiment, a first eNB may transmit a first message to a second eNB. The second eNB may transmit a second message to the first eNB. An example is shown in FIG. 25. The first message, for example, may be an eNB configuration update message, and the second message may be an eNB configuration update acknowledge message, wherein the first message and the second message may be exchanged as a part of an eNB configuration update procedure. Through the eNB configuration update procedure, the first eNB and/or the second eNB may update application level configuration data needed to interoperate over an X2 interface between the two eNBs. The first message may comprise up-to-date configuration data, e.g. lists of added, modified, and/or deleted served cells, that the first eNB may have taken into operational use. Upon reception of the first message, the second eNB may update information for the first eNB. In an example, the first message may comprise the radio resource status information, wherein the radio resource status information may comprise the LBT Failure information, the LBT Success information, the PRB/Subframe Tried, the PRB/Subframe Failed, the PRB/Subframe Used, the PRB/Subframe Usage, the Contention Level, the Average CW, the Current CW, and/or the absenceOfAnyOtherTechnology for an unlicensed/LAA cell operated by the message sending eNB. In an example, a served cell information IE in the eNB configuration update message may comprise the radio resource status information. In an example, after receiving the radio resource status information, the second eNB may initiate a UE handover, initiate/modify a dual connectivity of a UE, update mobility parameters, and/or initiate a mobility setting change procedure at least based on one or more elements of the radio resource status information.

Figure 26:
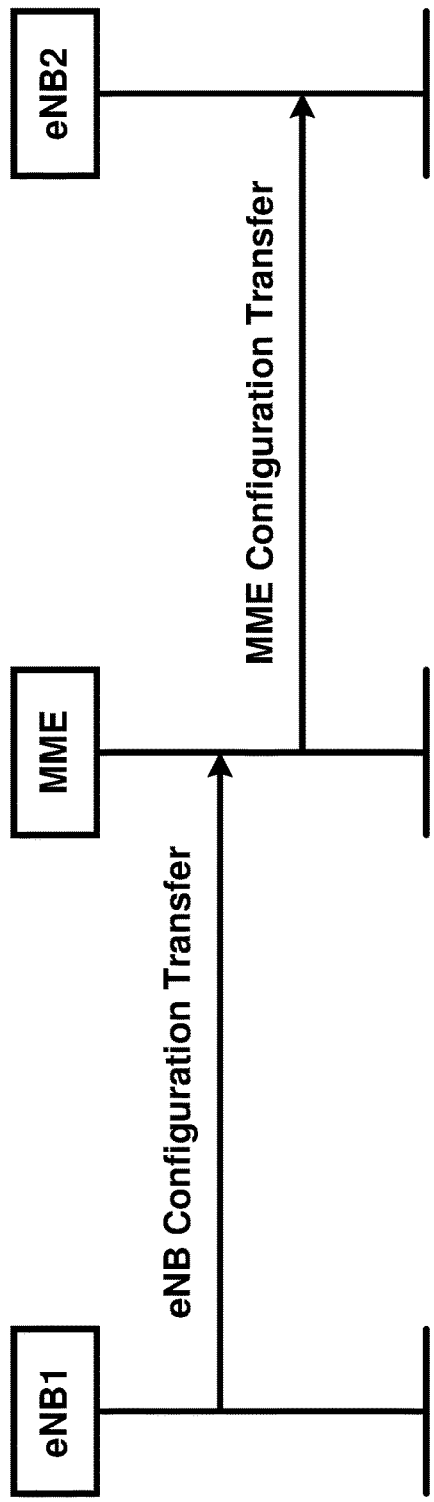
FIG. 26 is an example eNB configuration transfer procedure and MME configuration transfer procedure as per an aspect of an embodiment of the present disclosure.

In an example embodiment, a first eNB may transmit a first message to an MME. The MME may transmit a second message to a second eNB. An example is shown in FIG. 26. The first message, for example, may be an eNB configuration transfer message, and the second message may be an MME configuration transfer message. In an example, the first message may comprise the radio resource status information, wherein the radio resource status information may comprise the LBT Failure information, the LBT Success information, the PRB/Subframe Tried, the PRB/Subframe Failed, the PRB/Subframe Used, the PRB/Subframe Usage, the Contention Level, the Average CW, the Current CW, and/or the absenceOfAnyOtherTechnology for an unlicensed/LAA cell operated by the message sending eNB, and the second message may comprise one or more elements of the first message. In an example, after receiving the radio resource status information, the second eNB may initiate a UE handover, initiate/modify a dual connectivity of a UE, update mobility parameters, and/or initiate a mobility setting change procedure at least based on one or more elements of the radio resource status information.

Figure 27:
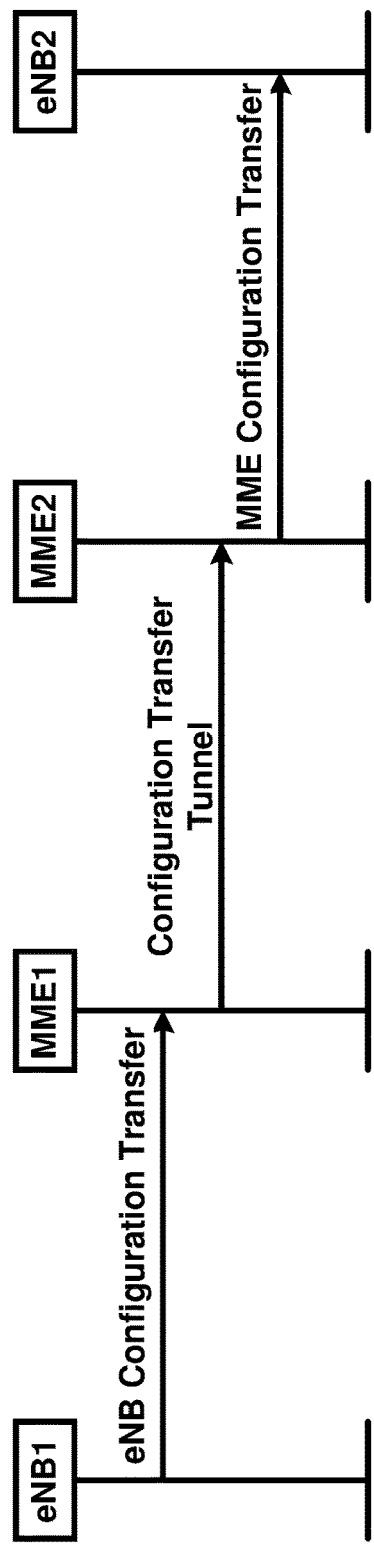
FIG. 27 is an example inter-MME eNB configuration transfer procedure and MME configuration transfer procedure as per an aspect of an embodiment of the present disclosure.

In an example embodiment, a first eNB may transmit a first message to a first MME. The first MME may transmit a second message to a second MME. The second MME may transmit a third message to a second eNB. An example is shown in FIG. 27. The first message, for example, may be an eNB configuration transfer message, the second message may be a configuration transfer tunnel message, and the third message may be an MME configuration transfer message. In an example, the first message may comprise the radio resource status information, wherein the radio resource status information may comprise the LBT Failure information, the LBT Success information, the PRB/Subframe Tried, the PRB/Subframe Failed, the PRB/Subframe Used, the PRB/Subframe Usage, the Contention Level, the Average CW, the Current CW, and/or the absenceOfAnyOtherTechnology for an unlicensed/LAA cell operated by the message sending eNB, and the second message and the third message may comprise one or more elements of the first message. In an example, after receiving the radio resource status information, the second eNB may initiate a UE handover, initiate/modify a dual connectivity of a UE, update mobility parameters, and/or initiate a mobility setting change procedure at least based on one or more elements of the radio resource status information.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 28:
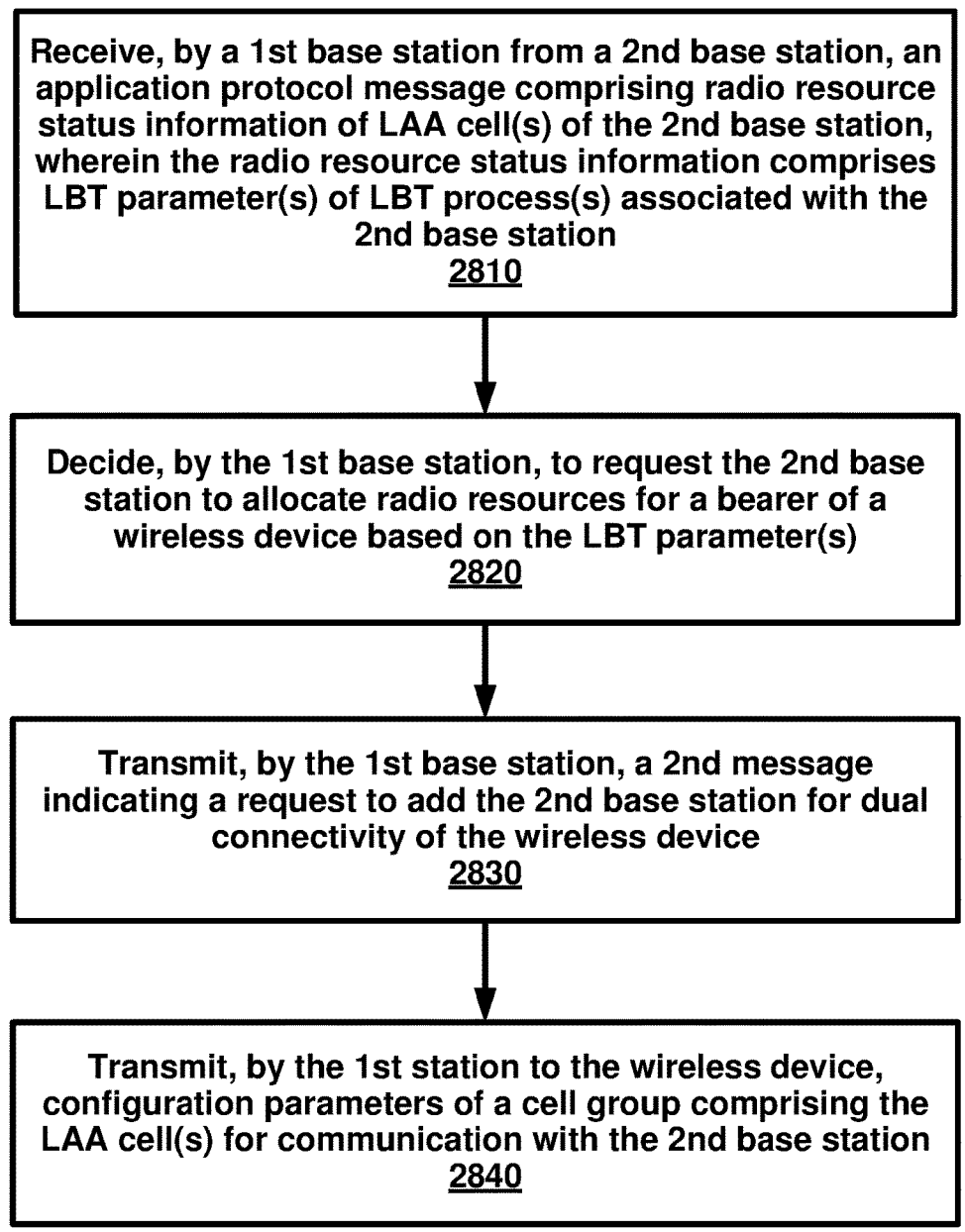
FIG. 28 is an example flow diagram as per an aspect of an embodiment of the present disclosure.

FIG. 28 is an example flow diagram as per an aspect of an embodiment of the present disclosure. At 2810, a first base station may receive from a second base station, an application protocol message. The application protocol message may comprise radio resource status information of one or more licensed assisted access (LAA) cells of the second base station. The radio resource status information may comprise at least one listen before talk (LBT) parameter of one or more LBT processes associated with the second base station. At 2820, the first base station may decide to request the second base station to allocate radio resources for a bearer of a wireless device based on the at least one LBT parameter. At 2830, the first base station may transmit a second message indicating a request to add the second base station for dual connectivity of the wireless device. At 2840, the first base station may transmit to the wireless device configuration parameters of a cell group comprising the one or more LAA cells for communication with the second base station.

According to an embodiment, the at least one LBT parameter may comprise one or more of LBT failure information, LBT success information, tried physical resource block (PRB) or subframe, failed PRB or subframe, PRB or subframe usage, contention level, average contention window (CW) size, current CW size, or an indication of absence of other technology.

According to an embodiment, the LBT failure information may be based on a first number of PRBs or subframes with failed LBT during a measurement period. According to an embodiment, the LBT failure information may correspond to downlink transmissions, or uplink transmissions, or downlink and uplink transmissions. According to an embodiment, the PRB or subframe usage may be based on a second number of PRBs or subframes used for packet transmission during a measurement period. According to an embodiment, the PRB or subframe usage may correspond to downlink transmissions, or uplink transmission, or downlink and uplink transmissions.

According to an embodiment, the average CW size may be based on one or more contention window sizes used for transmissions during a measurement period. According to an embodiment, the indication of absence of other technology indicates other technologies may not share spectrum of the one or more LAA cells. According to an embodiment, the application protocol message may be received from the second base station via one or more mobility management entities (MMEs). According to an embodiment, the at least one LBT parameter indicates that the one or more LAA cells are not highly occupied.

Figure 29:
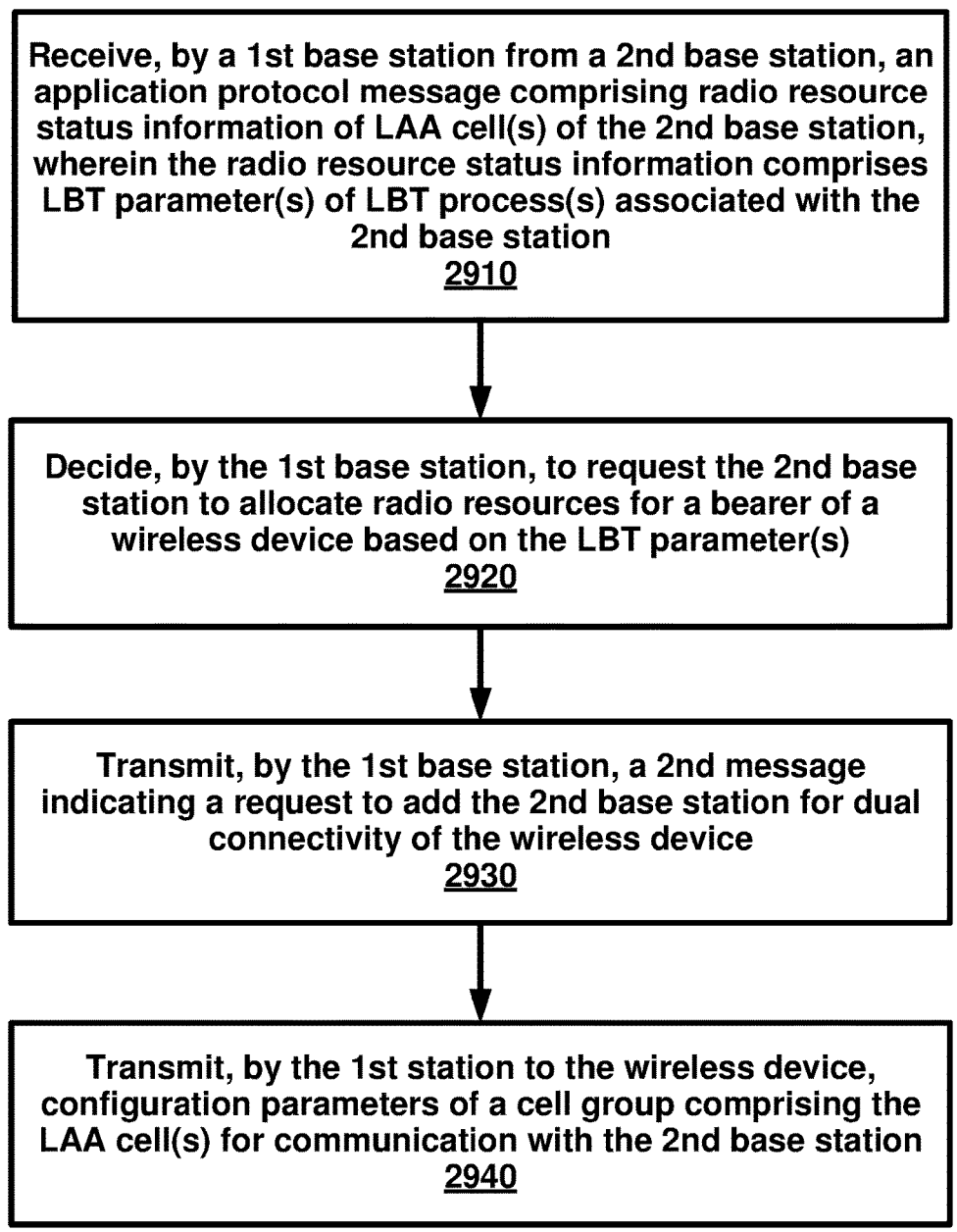
FIG. 29 is an example flow diagram as per an aspect of an embodiment of the present disclosure.

FIG. 29 is an example flow diagram as per an aspect of an embodiment of the present disclosure. At 2910, a first base station may receive from a second base station, an application protocol message. The application protocol message may comprise radio resource status information of one or more licensed assisted access (LAA) cells of the second base station. The radio resource status information may comprise at least one listen before talk (LBT) parameter of one or more LBT processes associated with the second base station. At 2920, the first base station may decide to request the second base station to allocate radio resources for a bearer of a wireless device based on the at least one LBT parameter. At 2930, the first base station may transmit a second message indicating a request to add the second base station for dual connectivity of the wireless device. At 2940, the first base station may transmit to the wireless device configuration parameters of a cell group comprising the one or more LAA cells for communication with the second base station.

According to an embodiment, the at least one LBT parameter may comprise one or more of LBT failure information, LBT success information, tried physical resource block (PRB) or subframe, failed PRB or subframe, PRB or subframe usage, contention level, average contention window (CW) size, current CW size, or an indication of absence of other technology.

According to an embodiment, the LBT failure information may be based on a first number of PRBs or subframes with failed LBT during a measurement period. According to an embodiment, the LBT failure information may correspond to downlink transmissions, or uplink transmissions, or downlink and uplink transmissions. According to an embodiment, the PRB or subframe usage may be based on a second number of PRBs or subframes used for packet transmission during a measurement period. According to an embodiment, the PRB or subframe usage may correspond to downlink transmissions, or uplink transmission, or downlink and uplink transmissions.

According to an embodiment, the average CW size may be based on one or more contention window sizes used for transmissions during a measurement period. According to an embodiment, the indication of absence of other technology indicates other technologies may not share spectrum of the one or more LAA cells. According to an embodiment, the application protocol message may be received from the second base station via one or more mobility management entities (MMEs). According to an embodiment, the at least one LBT parameter indicates that the one or more LAA cells are not highly occupied.

Figure 30:
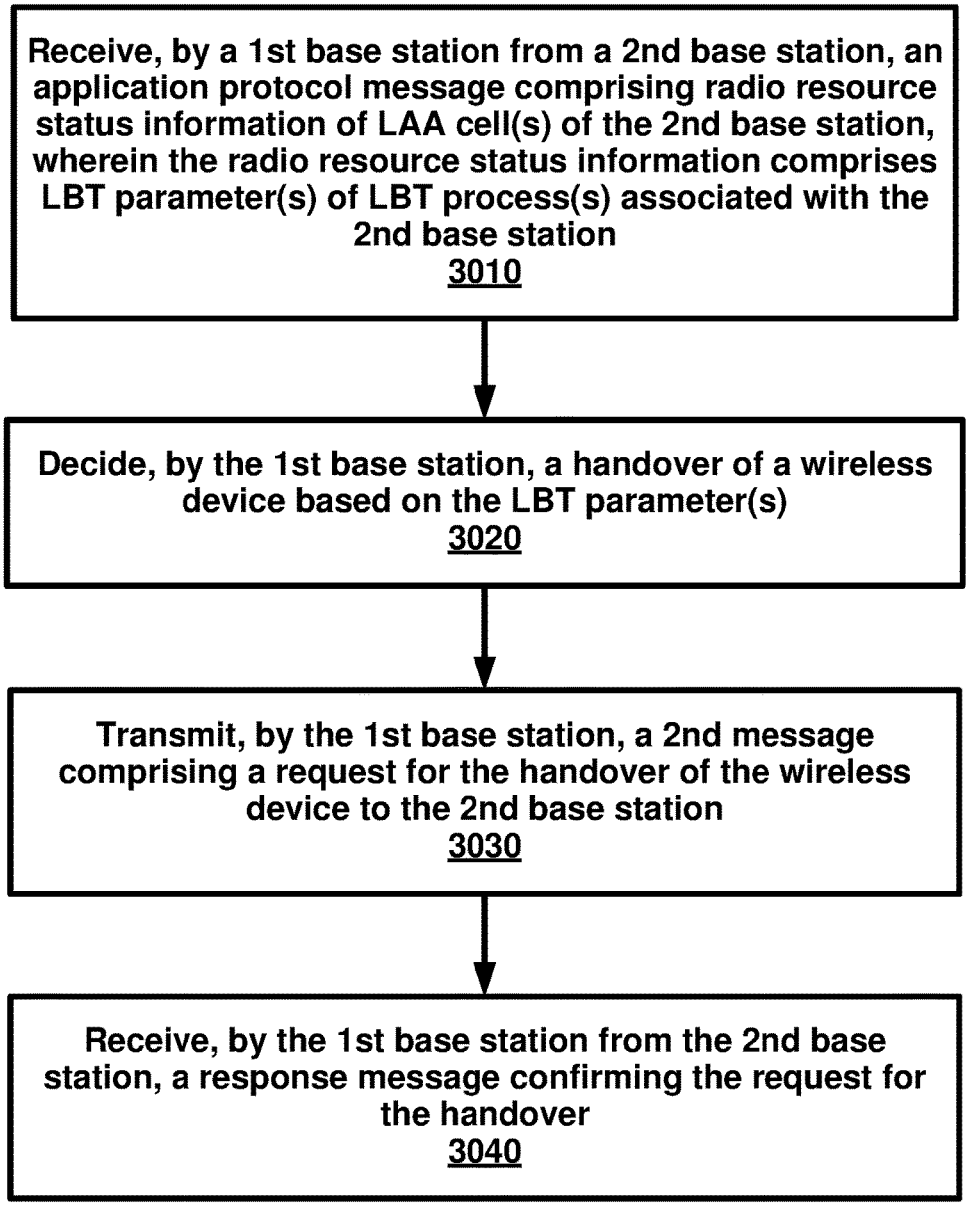
FIG. 30 is an example flow diagram as per an aspect of an embodiment of the present disclosure.

FIG. 30 is an example flow diagram as per an aspect of an embodiment of the present disclosure. At 3010, a first base station may receive from a second base station, an application protocol message. The application protocol message may comprise radio resource status information of one or more licensed assisted access (LAA) cells of the second base station. The radio resource status information may comprise at least one listen before talk (LBT) parameter of one or more LBT processes associated with the second base station.

At 3020, the first base station may decide a handover of a wireless device based on the at least one LBT parameter. At 3030, the first base station may transmit a second message comprising a request for the handover of the wireless device to the second base station. At 3040, the first base station may receive from the second base station, a response message confirming the request for the handover.

Figure 31:
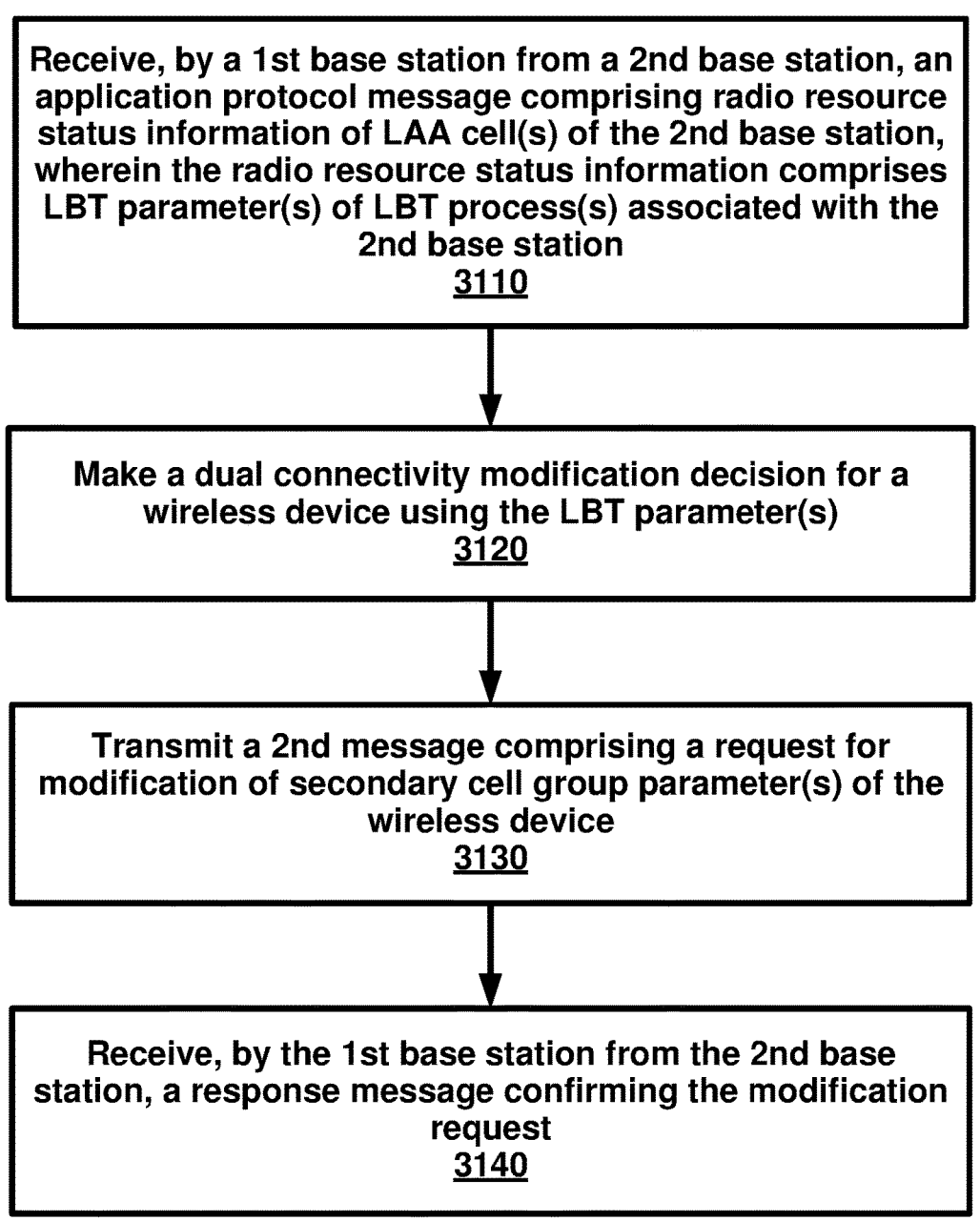
FIG. 31 is an example flow diagram as per an aspect of an embodiment of the present disclosure.

FIG. 31 is an example flow diagram as per an aspect of an embodiment of the present disclosure. At 3110, a first base station may receive from a second base station, an application protocol message. The application protocol message may comprise radio resource status information of one or more licensed assisted access (LAA) cells of the second base station. The radio resource status information may comprise at least one listen before talk (LBT) parameter of one or more LBT processes associated with the second base station.

At 3120, the first base station may make a dual connectivity modification decision for a wireless device using the at least one LBT parameter. At 3130, the first base station may transmit a second message comprising a request for modification of one or more secondary cell group parameters of the wireless device. At 3140, the first base station may receive from the second base station, a response message confirming the modification request.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   receiving, by a first base station from a second base station, an application protocol message comprising radio resource status information of one or more licensed assisted access (LAA) cells of the second base station, wherein the radio resource status information comprises at least one listen before talk (LBT) parameter based on one or more results of one or more LBT processes performed by the second base station on the one or more LAA cells;
   deciding, by the first base station, to request the second base station to allocate radio resources for a bearer of a wireless device based on the at least one LBT parameter;
   transmitting, by the first base station to the second base station, a request message to add the second base station for dual connectivity of the wireless device; and
   transmitting, by the first base station to the wireless device, configuration parameters of a cell group comprising the one or more LAA cells for communication with the second base station.

2. The method of claim 1, wherein the at least one LBT parameter comprises one or more of LBT failure information, LBT success information, tried physical resource block (PRB) or subframe, failed PRB or subframe, PRB or subframe usage, contention level, average contention window (CW) size, current CW size, or an indication of absence of other technology.

3. The method of claim 2, wherein the LBT failure information is based on a first number of PRBs or subframes with failed LBT during a measurement period.

4. The method of claim 2, wherein the LBT failure information corresponds to downlink transmissions, or uplink transmissions, or downlink and uplink transmissions.

5. The method of claim 2, wherein the PRB or subframe usage is based on a second number of PRBs or subframes used for packet transmission during a measurement period.

6. The method of claim 2, wherein the PRB or subframe usage corresponds to downlink transmissions, or uplink transmission, or downlink and uplink transmissions.

7. The method of claim 2, wherein the average CW size is based on one or more contention window sizes used for transmissions during a measurement period.

8. The method of claim 2, wherein the indication of absence of other technology indicates other technologies do not share spectrum of the one or more LAA cells.

9. The method of claim 1, wherein the application protocol message is received from the second base station via one or more mobility management entities (MMEs).

10. The method of claim 1, wherein the at least one LBT parameter indicates that the one or more LAA cells are not highly occupied.

11. A base station apparatus comprising:
    one or more processors;
    memory storing instructions that, when executed by the one or more processors, cause the base station to:
       receive from a second base station, an application protocol message comprising radio resource status information of one or more licensed assisted access (LAA) cells of the second base station, wherein the radio resource status information comprises at least one listen before talk (LBT) parameter based on one or more results of one or more LBT processes performed by the second base station on the one or more LAA cells;
       decide to request the second base station to allocate radio resources for a bearer of a wireless device based on the at least one LBT parameter;
       transmit to the second base station, a request message to add the second base station for dual connectivity of the wireless device; and
       transmit to the wireless device, configuration parameters of a cell group comprising the one or more LAA cells for communication with the second base station.

12. The base station apparatus of claim 11, wherein the at least one LBT parameter comprises one or more of LBT failure information, LBT success information, tried physical resource block (PRB) or subframe, failed PRB or subframe, PRB or subframe usage, contention level, average contention window (CW) size, current CW size, or an indication of absence of other technology.

13. The base station apparatus of claim 12, wherein the LBT failure information is based on a first number of PRBs or subframes with failed LBT during a measurement period.

14. The base station apparatus of claim 12, wherein the LBT failure information corresponds to downlink transmissions, or uplink transmissions, or downlink and uplink transmissions.

15. The base station apparatus of claim 12, wherein the PRB or subframe usage is based on a second number of PRBs or subframes used for packet transmission during a measurement period.

16. The base station apparatus of claim 12, wherein the PRB or subframe usage corresponds to downlink transmissions, or uplink transmission, or downlink and uplink transmissions.

17. The base station apparatus of claim 12, wherein the average CW size is based on one or more contention window sizes used for transmissions during a measurement period.

18. The base station apparatus of claim 12, wherein the indication of absence of other technology indicates other technologies do not share spectrum of the one or more LAA cells.

19. The base station apparatus of claim 11, wherein the application protocol message is received from the second base station via one or more mobility management entities (MMEs).

20. The base station apparatus of claim 11, wherein the at least one LBT parameter indicates that the one or more LAA cells are not highly occupied.

* * * * *